United States Patent
Gallagher et al.

(10) Patent No.: US 7,303,047 B2
(45) Date of Patent: Dec. 4, 2007

(54) APPARATUS FOR FILTERING ULTRASONIC NOISE WITHIN A FLUID FLOW SYSTEM

(75) Inventors: James E. Gallagher, Kingwood, TX (US); Michael P. Saunders, Kingwood, TX (US)

(73) Assignee: Savant Measurement Corporation, Houston, TX (US)

( * ) Notice: Subject to any disclaimer, the term of this patent is extended or adjusted under 35 U.S.C. 154(b) by 0 days.

(21) Appl. No.: 11/179,327

(22) Filed: Jul. 12, 2005

(65) Prior Publication Data

US 2006/0011412 A1 Jan. 19, 2006

Related U.S. Application Data

(62) Division of application No. 10/410,429, filed on Apr. 9, 2003, now Pat. No. 7,011,180.

(60) Provisional application No. 60/411,572, filed on Sep. 18, 2002.

(51) Int. Cl.
*F01N 7/02* (2006.01)
*F01N 1/12* (2006.01)
*F01N 1/10* (2006.01)

(52) U.S. Cl. .................. 181/279; 181/232

(58) Field of Classification Search ........... 181/232, 181/296, 252, 251, 256, 257, 258, 268, 275, 181/279, 280, 224, 225, 226, 233, 270; 138/39, 138/42, 44, 26
See application file for complete search history.

(56) References Cited

U.S. PATENT DOCUMENTS 1,473,349 A 11/1923 Kach (Continued)

FOREIGN PATENT DOCUMENTS

CA 2138686 8/1995

(Continued)

OTHER PUBLICATIONS

Stuart, Pacific Gas and Electric Company, San Francisco, CA, "Attenuation of Ultrasonic Noise in 2" ABS Pipe Fittings," Presentation @ American Gas Association Conference, Dallas, TX, Apr. 2001.

(Continued)

*Primary Examiner*—Edgardo San Martin
(74) *Attorney, Agent, or Firm*—Strasburger & Price, LLP

(57) ABSTRACT

A method is employed to attenuate ultrasonic noise propagating in a flow stream of a fluid flow system. In particular, the method attenuates the noise propagating between a noise source and a reference point in the flow stream (wherein the reference point and the noise source are positioned in the flow stream in direct acoustic line of sight relation). The method includes positioning an absorbent element in the flow stream between the noise source and the reference point. Then, the ultrasonic noise is directed past vicinity of the absorbent element such that indirect ultrasonic noise is absorbed by the absorbent element. Preferably, the method also includes deflecting the ultrasonic noise to convert direct noise to indirect noise prior to directing the ultrasonic noise past the vicinity of the absorbent material in the flow stream. Such a method may be employed to attenuate ultrasonic noise by up to about 20 dB to 45 dB.

20 Claims, 13 Drawing Sheets

U.S. PATENT DOCUMENTS

| | | |
|---|---|---|
| 1,759,239 A | 5/1930 | Morrison |
| 1,980,672 A | 11/1934 | Engel |
| 2,391,110 A | 12/1945 | Walker |
| 2,600,733 A | 6/1952 | Clift |
| 2,688,985 A | 9/1954 | Holdenried |
| 2,803,962 A | 8/1957 | West |
| 2,842,962 A | 7/1958 | Dall |
| 2,896,668 A | 7/1959 | Aitken |
| 2,927,462 A | 3/1960 | Li |
| 2,929,248 A | 3/1960 | Sprenkle |
| 2,998,860 A * | 9/1961 | Everett ............... 181/257 |
| 3,020,592 A | 2/1962 | MacCaferri |
| 3,105,570 A | 10/1963 | Bezemes |
| 3,191,630 A | 6/1965 | Demyan |
| 3,235,003 A * | 2/1966 | Smith ............... 165/135 |
| 3,250,469 A | 5/1966 | Colston |
| 3,280,807 A | 10/1966 | Bardy |
| 3,393,767 A * | 7/1968 | Monk ............... 181/280 |
| 3,545,492 A | 12/1970 | Scheld, Jr. |
| 3,564,912 A | 2/1971 | Malone et al. |
| 3,572,391 A | 3/1971 | Hirsch |
| 3,590,946 A * | 7/1971 | Corn, Jr. ............... 181/256 |
| 3,645,298 A | 2/1972 | Roberts et al. |
| 3,715,870 A | 2/1973 | Guzick |
| 3,733,898 A | 5/1973 | Yamamoto et al. |
| 3,778,083 A | 12/1973 | Hamasaki |
| 3,798,345 A | 3/1974 | Priaroggin et al. |
| 3,838,598 A | 10/1974 | Tompkins |
| 3,840,051 A | 10/1974 | Akashi et al. |
| 3,940,985 A | 3/1976 | Wyler |
| 3,964,519 A | 6/1976 | DeBaun |
| 4,050,539 A * | 9/1977 | Kashiwara et al. ......... 181/280 |
| 4,104,915 A | 8/1978 | Husse |
| 4,108,276 A * | 8/1978 | Hall et al. ............... 181/256 |
| 4,130,173 A | 12/1978 | Cooksey |
| 4,140,012 A | 2/1979 | Hendriks |
| 4,141,334 A | 2/1979 | Hatz et al. |
| 4,142,413 A | 3/1979 | Bellinga |
| 4,204,586 A | 5/1980 | Hani et al. |
| 4,236,597 A * | 12/1980 | Kiss et al. ............... 181/224 |
| 4,280,360 A | 7/1981 | Kobayashi et al. |
| 4,317,178 A | 2/1982 | Head |
| 4,317,502 A * | 3/1982 | Harris et al. ............... 181/280 |
| 4,371,054 A | 2/1983 | Wirt |
| 4,468,971 A | 9/1984 | Herzl et al. |
| 4,485,890 A * | 12/1984 | Harris et al. ............... 181/280 |
| 4,503,594 A | 3/1985 | Gall et al. |
| 4,509,371 A | 4/1985 | Wellman |
| 4,522,077 A | 6/1985 | Köberle |
| 4,523,478 A | 6/1985 | Zacharias, Jr. |
| 4,528,652 A | 7/1985 | Horner et al. |
| 4,528,847 A | 7/1985 | Halmi |
| 4,533,015 A * | 8/1985 | Kojima ............... 181/280 |
| 4,557,296 A | 12/1985 | Byrne |
| 4,605,092 A * | 8/1986 | Harris et al. ............... 181/280 |
| 4,646,575 A | 3/1987 | O'Hair et al. |
| 4,649,760 A | 3/1987 | Wedding |
| 4,712,585 A | 12/1987 | Evans |
| 4,729,722 A | 3/1988 | Toth |
| 4,790,864 A | 12/1988 | Kostun |
| 4,791,810 A | 12/1988 | Old et al. |
| 4,974,452 A | 12/1990 | Hunt et al. |
| 5,058,704 A * | 10/1991 | Yu ............... 181/262 |
| 5,104,233 A * | 4/1992 | Kojima ............... 366/339 |
| 5,213,080 A | 5/1993 | Lambert et al. |
| 5,255,716 A | 10/1993 | Wilcox |
| 5,295,397 A | 3/1994 | Hall et al. |
| 5,327,941 A | 7/1994 | Bitsakis et al. |
| 5,341,848 A | 8/1994 | Laws |
| 5,392,815 A * | 2/1995 | Stuart ............... 138/37 |
| 5,443,371 A * | 8/1995 | Calciolari ............... 417/312 |
| 5,461,932 A | 10/1995 | Hall et al. |
| 5,495,872 A * | 3/1996 | Gallagher et al. ............... 138/44 |
| 5,521,840 A | 5/1996 | Bednar |
| 5,529,093 A * | 6/1996 | Gallagher et al. ............... 138/44 |
| 5,546,812 A | 8/1996 | Drenthen |
| 5,606,297 A * | 2/1997 | Phillips ............... 333/141 |
| 5,617,899 A | 4/1997 | Linton et al. |
| 5,664,760 A | 9/1997 | Army, Jr. et al. |
| 5,827,430 A * | 10/1998 | Perry et al. ............... 210/497.01 |
| 5,861,561 A | 1/1999 | Van Cleve et al. |
| 6,053,054 A | 4/2000 | Wusterbarth et al. |
| 6,089,348 A * | 7/2000 | Bokor ............... 181/272 |
| 6,338,277 B1 * | 1/2002 | Diston et al. ............... 73/861.28 |
| 6,382,033 B1 * | 5/2002 | van Bekkum et al. ... 73/861.28 |
| 6,494,105 B1 * | 12/2002 | Gallagher ............... 73/861.27 |
| 6,533,065 B2 * | 3/2003 | Zanker ............... 181/264 |
| 6,698,455 B2 | 3/2004 | Ramirez-Rivera |
| 6,851,322 B2 * | 2/2005 | Gallagher ............... 73/861.27 |
| 7,011,180 B2 * | 3/2006 | Gallagher et al. ............... 181/232 |
| 7,073,534 B2 | 7/2006 | Sawchuk et al. |
| 7,089,963 B2 | 8/2006 | Meheen |
| 2001/0038575 A1 | 11/2001 | Mathys et al. |
| 2003/0178077 A1 | 9/2003 | Ramirez-Rivera |
| 2005/0178445 A1 | 8/2005 | Cancade et al. |
| 2005/0263199 A1 | 12/2005 | Meheen |
| 2006/0006022 A1 | 1/2006 | Gallagher et al. |
| 2006/0011413 A1 | 1/2006 | Gallagher et al. |
| 2006/0231149 A1 | 10/2006 | Kulkarni |

FOREIGN PATENT DOCUMENTS

| | | |
|---|---|---|
| CA | 2228928 | 8/1995 |
| CA | 2307727 | 11/2000 |
| CH | 20606 | 12/1899 |
| DE | 224528 | 8/1922 |
| DE | 1473034 | 8/1964 |
| EP | 15354 A1 | 9/1980 |
| EP | 34079 A1 | 8/1981 |
| EP | 34079 B1 | 8/1981 |
| EP | 0483206 B1 | 5/1992 |
| JP | 57-54705 | 1/1982 |
| JP | 57-190106 | 11/1982 |
| JP | 59046817 A * | 3/1984 |
| JP | 03114099 A * | 5/1991 |
| MX | 192110 | 1/1995 |
| MX | 211588 | 1/1995 |
| NO | 55970 | 12/1935 |
| SE | 11648 | 12/1899 |
| SU | 901680 | 1/1979 |
| WO | WO 91/01452 | 2/1991 |
| WO | WO 9420821 A1 * | 9/1994 |
| WO | WO 9922207 A1 * | 5/1999 |

OTHER PUBLICATIONS

Vermeulen et al., Instromet Ultrasonics BV, Dordrecht, The Netherlands and Instromet Inc., Houston, "A model for estimation of the ultrasonic acoustic noise level emitted by pressure regulating valves and its influence on ultrasonic flowmeters," Presentation @ American Gas Association Conference, Dallas, TX, Apr. 2001.

Terrence A. Grimley, Paper 19: Performance Testing of Ultrasonic Flow Meters, 1997 North Sea Flow Measurement Workshop, Organizer: Norwegian Society of Chartered Engineers et al (22 pages).

Ultrasonic Metering Task Group, Ultrasonic Flow Measurement for Natural Gas Applications, A.G.A. Operating Section Transmission Measurement Committee Engineering Technical Note M-96-2-3 © 1996 American Gas Association (41 pages).

Reidar Sakariassen, Paper 5: Why We Use Ultrasonic Gas Meters, North Sea Flow Measurement Workshop, Organizer: Norwegian Society of Chartered Engineers et al, (1995) (17 pages).

Terry Cousins, Ultrasonic Flow Measurement Present and Future, NORFLOW Oil & Gas Flow Measurement in the North Sea, Aberdeen, May 29, 1997 (3 pages).

G.J. Stobie & K. Zanker, Paper 14: Ultrasonic Meter: In Situ Skid Mounted Flow Testing, 1995 North Sea Flow Measurement Workshop, Organizer: Norwegian Society of Chartered Engineers (31 pages).

R. Sakariassen et al., Paper 15: On-Line Quality Control of Ultrasonic Gas Flow Meters, 1997 North Sea Flow Measurement Workshop, Organizer: Norwegian Society of Chartered Engineers (15 pages).

S. De Jong et al. "Effects of Header Configurations on Flow Metering", 1995 International Gas Research Conference (10 pages).

ISO International Standard ISO 5167-1 Measurement of Fluid Flow by means of pressure differential devices—Part 1 Orifice Plates, Nozzles and Venturi tubes Inserted In Circular Cross-Section Conduits Running Full, Sections 7.3 and 7.4 (1991) (6 pages).

Literature Review of the Performance of Flow Conditioners for NMSPU, National Engineering Laboratory (1996) (28 pages).

Gallagher, et al. Development of Gallagher Flow Conditioner (1994) (18 pages).

49 C.F.R. § 192.1 to 192.455 (2004) (42 pages).

49 C.F.R. § 195.0 to 195.206 (2004) (18 pages).

ASME B31.4-2006, Pipeline Transportation Systems for Liquid Hydrocarbons and Other Liquids, New York, NY USA © 2006 The American Society of Mechanical Engineers (126 pages).

ASME B31.8-2003, Gas Transmission and Distribution Piping Systems, New York, NY USA © 2004, The American Society of Mechanical Engineers (191 pages).

ASME B31.3-2004, Process Piping, New York, NY USA © 2005 The American Society of Mechanical Engineers (367 pages).

Savant Measurement Corporation, Safe Qualifications, © 2003 Powerpoint Presentation, Kingwood, TX, dated Jan. 1, 2001 (10 pages).

James E. Gallagher, Savant Measurement Corporation, High Velocity Testing of Ultrasonic Acoustic Filter, Kingwood, TX (2 pages) (no date provided).

James E. Gallagher, Savant Measurement Corporation, Ultrasonic Noise Acoustic Filters, Kingwood, TX (6 pages) (no date provided).

Savant Measurement Corporation, Safe R&D Data—Summary of Results, Aug. 2001, Kingwood, TX (1 page).

Gas Technology Institute Metering Research Facility, Test Report: Testing of a Savant 6-inch Safe Acoustic Filter, San Antonio, TX, Jan. 2003 (9 pages).

Defendant Istromet, Inc.'s Original Answer, Affirmative Defenses, and Counterclaims (2004) including reference to publications listed in above-cited number in Exhibits A, B, C, D, E, F, G, H, I, and J. (15 pages).

T.B. Morrow, Orifice Meter Installation Effects in the GRI MRF, Southwest Research Institute, San Antonio, TX (7 pages) (no date provided).

Dr. H.H. Dijstelbergen and Ing. J.T.M. Bergervoet, Optimal Straightening Vanes for Turbine Meters, Essen Belgium, Silvolde, Netherlands, Fluid Flow Measurement 3rd International Symposium (14 pages) (no date provided).

E.M. Laws and A.K. Ouazzane, Flow Conditioning for Orifice Plate Flow Meters, Department of Aeronautical, Mechanical, and Manufacturing Engineering, University of Salford, Salford, UK, Fluid Flow Measurement 3rd International Symposium (14 pages) (no date provided).

J.E. Gallagher, J.R. Coats, H.W. Butts, P.J. Lanasa, Custody Transfer Metering Performance for Turbine and Positive Displacement Meters on Batched Crude Oil Pipelines, Houston, Texas, Fluid Flow Measurement, 3rd International Symposium (30 pages) (no date provided).

J.E. Gallagher, P.J. Lanasa, Field Performance of the Gallagher Flow Conditioner, Houston, Texas, Fluid Flow Measurement 3rd International Symposium (20 pages) (no date provided).

William J. Astelford, Low Pressure Loop Tests of Shell Flow Conditioners, Southwest Research Institute, San Antonio, Texas, Jun. 1993 (144 pages).

Ing C.J. Benard, Handbook of Fluid Flowmetering, pp. 273-281; Effect of Pipework on Flowmeter Calibration,1st Edition, © 1988, The Trade & Technical Press Limited, Surrey England (12 pages).

John W. Stuart, Pacific Gas and Electric Company, San Francisco, CA, "Attenuation of Ultrasonic Noise in 2" ABS Pipe Fittings," Presentation @ American Gas Association Conference, Dallas, TX, Apr. 2001 (4 pages).

Marcel J.M. Vermeulen et al., Instromet Ultrasonics BV, Dordrecht, The Netherlands and Instromel Inc., Houston, "A Model For Estimation of the Ultrasonic Acoustic Noise Level Emitted by Pressure Regulating Valves and Its Influence on Ultrasonic Flowmeters," Presentation @ American Gas Association Conference, Dallas, TX, Apr. 2001 (10 pages).

Sens, Marcel and Teule, Claude; Étude Théorique et expérimentale d'un nouveau redresseur d'écoulement (Theoretical and Experimental Study of a New Flow Straightener) (18 pages) (no date provided).

\* cited by examiner

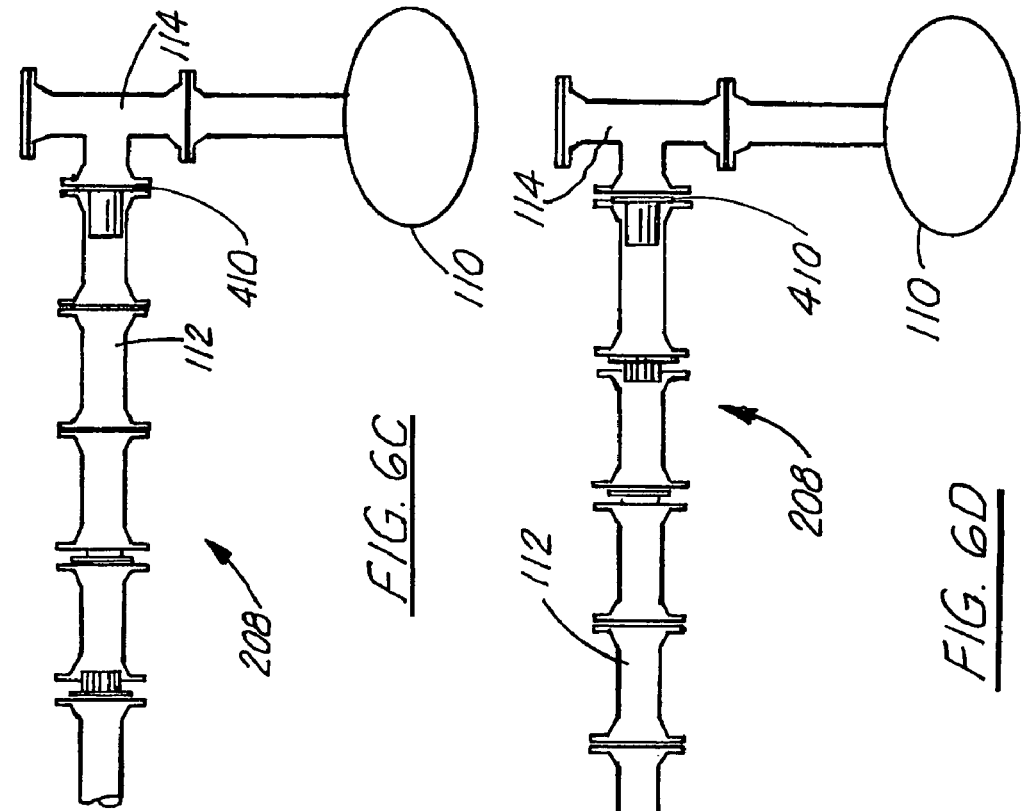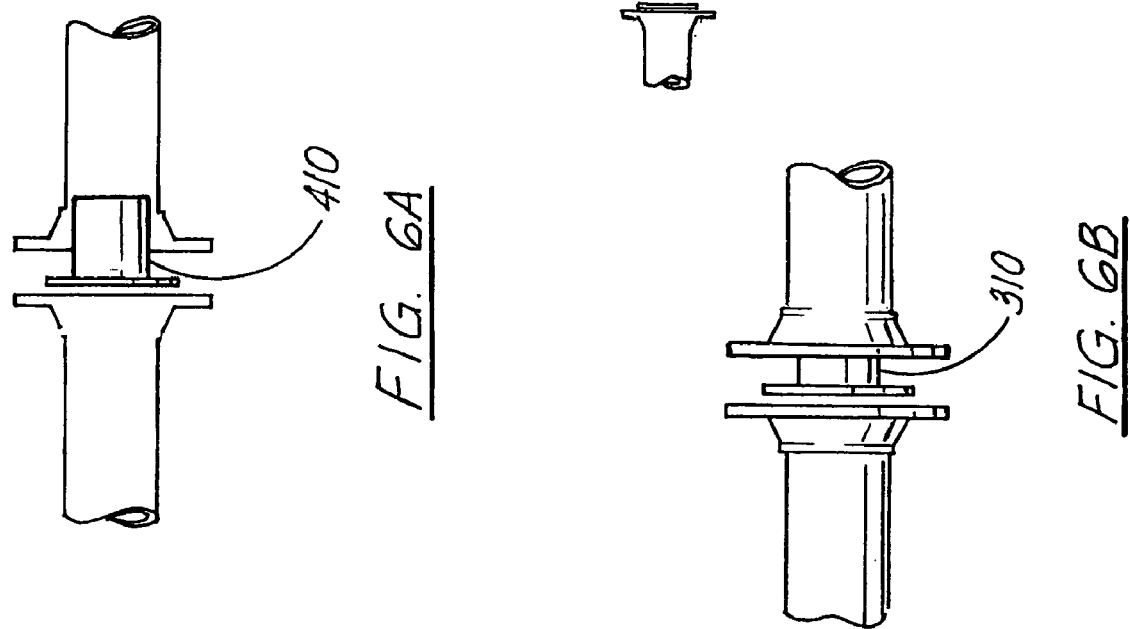

APPARATUS FOR FILTERING ULTRASONIC NOISE WITHIN A FLUID FLOW SYSTEM

This application is a Divisional of U.S. patent application Ser. No. 10/410,429 filed Apr. 9, 2003, which issued on Mar. 14, 2006 as U.S. Pat. No. 7,011,180, which is hereby incorporated by reference for all purposes. The present invention claims the benefit of the filing date of U.S. Provisional Application Ser. No. 60/411,572 filed Sep. 18, 2002. The above Provisional Application is also hereby incorporated by reference for all purposes and made a part of the present disclosure.

BACKGROUND OF THE INVENTION

The present invention relates generally to a system, apparatus and method for filtering acoustic noise within a fluid flow system. More particularly, the invention relates to the mitigation or attenuation of ultrasonic noise, and the incorporation of such an apparatus within a fluid flow system that includes a noise source and an ultrasonic device. Further, the invention relates to the elements or components of such an apparatus, particularly directed to attenuating direct and/or indirect noise within a fluid flow environment.

Sound or noise is a longitudinal mechanical wave motion in an elastic medium and is classified according to its frequency—infrasonic, audible, and ultrasonic. The infrasonic classification refers to frequencies below the detection level of the human ear (less than 20 Hz). The audible classification refers to frequency that can be detected by the human ear (from 20-20,000 Hz). The ultrasonic classification refers to frequencies above the detection level of the human ear (above 20,000 Hz). Sensory effects of sounds denoted by a physiologist as loudness, pitch, and quality are correlated with the measurable parameters of sound denoted by physicists as intensity, frequency and wave shape.

The intensity of a sound wave is the amount of wave energy transmitted per unit time per unit area normal to the direction of sound propagation. That is, the intensity of sound is the power transmitted per unit area. In the audible classification of noise, the significant intensities for a human species are:

| Noise | Intensity (W/$M_2$) | Level (dB) |
| --- | --- | --- |
| Hearing Threshold | 1 E–12 | 0 |
| Whisper | 1 E–10 | 20 |
| Conversation | 1 E–06 | 65 |
| Street Traffic | 1 E–05 | 75 |
| Train in a Tunnel | 1 E–02 | 100 |
| Pain Threshold | 1 E–00 | 120 |

Acoustics is a systematic investigation of the nature, origin, and propagation of sound. Acoustic noise generation in a closed conduit can occur from many sources, including protruding gaskets, misaligned pipe flanges, headers, line size changes, valves, etc. The flowing velocity in the pipe is a major factor in the character of the acoustic noise. When pipe velocity is below 50 fps, one would expect noise from only a control valve, which is designed to manipulate the flow. When the pipe velocity is greater than 50 fps, noise generation can be initiated by a multitude of the aforementioned sources.

Sound waves are pressure pulses propagate in accordance with acoustic plane wave theory. Sound propagates as a pressure wave in gas flow system, i.e., pipe system or other fluid conduit, at the velocity of sound of the fluid. Such a propagating pressure wave will be reflected and absorbed at impedance discontinuities forming standing wave patterns or acoustic resonances. These resonances typically amplify pulsation by a factor of 10 to 100.

Noise travelling along the longitudinal direction, i.e., in parallel with the longitudinal centerline of the conduit, may be referred to as direct noise. Noise travelling in a direction that is not parallel to, or not oblique with respect to, the longitudinal centerline may be referred to as indirect noise. Direct noise may become indirect noise upon encountering a bend, obstruction, or certain discontinuities in the flow medium, that forces the pressure wave to reflect, refract or otherwise deviate from the direct or longitudinal direction. Indirect noise may, therefore, propagate through a extensive run of conduit by bouncing or reflecting off the walls of the conduit.

BRIEF SUMMARY OF THE INVENTION

In one aspect of the present invention, a fluid flow system is provided that includes a fluid flow conduit, a noise source disposed in the fluid flow conduit such that ultrasonic noise generated by the noise source propagates therein, and an ultrasonic noise filter apparatus also disposed in the fluid flow conduit. The ultrasonic noise filter apparatus includes a first and a second noise filter. The first noise filter has an absorbent element that is constructed to attenuate ultrasonic noise propagating from the noise source in the direction of the first and second noise filters. The second noise filter is advantageously disposed in the fluid flow conduit between the first noise filter and the noise source and includes a deflector element positioned to deflect ultrasonic noise propagating from the noise source before the ultrasonic noise passes to the first noise filter.

In this inventive fluid flow system, the deflector element is preferably acoustically positioned so as to provide the sole direct line of sight acoustic obstruction between the noise source and the first noise filter. In other words, the noise source and the first noise filter would be disposed in direct line of sight acoustic relation if not for the presence of the second noise filter. More preferably, the fluid flow system includes an ultrasonic device (e.g. an ultrasonic flow meter) that is operable at ultrasonic frequencies. The ultrasonic device is positioned in the fluid flow conduit such that the first and second noise filters are intermediate the ultrasonic device and the noise source. Further, the second noise filter preferably provides the sole direct line of sight obstruction between the ultrasonic device and the noise source.

In another aspect of the invention, a method is provided for attenuating ultrasonic acoustic noise in a fluid flow system between a noise source and a reference point. The reference point and the noise source are disposed in fluid communication such that absent any flow obstruction therebetween, the noise source and the reference point (e.g., an ultrasonic flow meter) would be positioned in direct line of sight acoustic relation and such that noise generated by the noise source propagates between the noise source and the reference point through a fluid flow path defined therethrough. The inventive method includes the steps of eliminating a direct acoustic line of sight between the noise source and the reference point and positioning an absorbent material in the flow path and in generally parallel relation therewith. During flow conditions, the absorbent material is utilized to absorb indirect noise propagating through the flow path and converting the absorbed indirect noise to vibration. Preferably, the step of eliminating the direct line of sight is performed acoustically upstream of the point where the step of absorbing is performed.

In another aspect of the invention, an ultrasonic acoustic noise filter is provided for incorporation into a fluid flow conduit and for attenuating ultrasonic noise propagating in the fluid flow conduit. This inventive noise filter includes a flow entrance, a flow exit, a plurality of channels extending between the flow entrance and the flow exit, and an absorbent element supported within one or more of the channels. Each of the channels defines a flow path between the entrance and the exit. Further, the absorbent element includes an absorbent material disposed in generally parallel relation with the flow path and configured to absorb indirect ultrasonic noise propagating in the flow path.

In yet another aspect of the invention, the ultrasonic noise filter includes a flow entrance and a flow exit that define a flow path therebetween and has a longitudinal centerline. The noise filter further includes an absorbent element disposed in the flow path. This absorbent element has lateral sections of absorbent material which are configured to absorb indirect noise propagating in the flow path. The lateral sections are disposed generally parallel with the flow path and are formed by spirally wound layers of the absorbent material. The absorbent material is preferably a fibrous, polyester material.

In yet another aspect of the invention, a method is employed to attenuate ultrasonic noise propagating in a flow stream of a fluid flow system. In particular, the method attenuates the noise propagating between a noise source and a reference point in the flow stream (wherein the reference point and the noise source are positioned in the flow stream in direct acoustic line of sight relation). The method includes positioning an absorbent element in the flow stream between the noise source and the reference point. Then, the ultrasonic noise is directed past vicinity of the absorbent element such that indirect ultrasonic noise is absorbed by the absorbent element. Preferably, the method also includes deflecting the ultrasonic noise to convert direct noise to indirect noise prior to directing the ultrasonic noise past the vicinity of the absorbent material in the flow stream. In the above manner, a method according to the invention may be employed to attenuate ultrasonic noise by up to about 20 dB to 45 dB.

In yet another aspect of the invention, a fluid flow system is provided including an ultrasonic device, a noise source and an ultrasonic acoustic noise filter. The ultrasonic device is a device such as an ultrasonic flow meter that is operational at ultrasonic frequencies. The noise source, which may be any one of a number of ultrasonic noise generators including control valves and flow regulators, is disposed in the fluid flow conduit and in fluid communication with the ultrasonic device and the noise filter. The ultrasonic acoustic noise filter is also disposed in the fluid flow conduit, between the ultrasonic device and the noise source, and in fluid communication with both components so as to define a fluid flow stream therebetween. Further, the noise filter includes an absorbent element for attenuating ultrasonic noise propagating from the noise source in the direction of the ultrasonic device.

In a preferred embodiment, the absorbent element is positioned in general parallel relation with the flow stream. Thus, the absorbent element is particularly adapted to absorbing indirect ultrasonic noise and/or converting noise energy into kinetic energy (i.e., vibrations within an absorbent material of the absorbent element). A preferred absorbent element has or consists of an absorbent material constructed of multiple spirally-wound, overlapping layers of fibrous material (e.g., polyester, polypropylene, or combinations thereof), thereby creating protrusions into the flow stream (for effecting turbulence). The fibrous network or components of the absorbent material are also particularly adapted to absorbing noise energy and effecting vibrations as a result thereof.

Thus, in one method of attenuating ultrasonic noise in a fluid flow system according to the invention, absorbent material is positioned in the flow stream between the noise source (e.g., a control valve) and a reference point (for purposes of evaluating the degree of attenuation) (e.g., an ultrasonic flow meter). Preferably, the absorbent material is positioned in generally parallel relation with the flow stream and thus, generally obliquely with the propagation direction of indirect noise. The ultrasonic noise is then directed past the vicinity of the absorbent material, such that at least some of the indirect noise energy in the ultrasonic noise is absorbed by conversion into kinetic energy (e.g., vibration within the absorbent material).

In yet another aspect of the inventive method, ultrasonic noise propagating from the noise source is first manipulated, e.g., deflected, to transform some of the direct noise into indirect noise, prior to encountering the absorbent material. For example, the ultrasonic noise may be directed through a flow-through device to eliminate a direct acoustic line of sight relation between the noise source and a reference point downstream of the noise source. The ultrasonic noise is then directed downstream in the vicinity of the absorbent material, such that indirect noise is absorbed by the absorbent material. In this manner, the inventive method may be employed to eliminate between about 20 dB to about 50 dB of ultrasonic acoustic noise.

BRIEF DESCRIPTION OF THE DRAWINGS

FIGS. 6A, 6B, 6C, 6D, 6E and 6F are various simplified schematics of fluid flow systems in accordance with or embodying various aspects of the present invention.

DETAILED DESCRIPTION OF THE INVENTION

Figure 1:
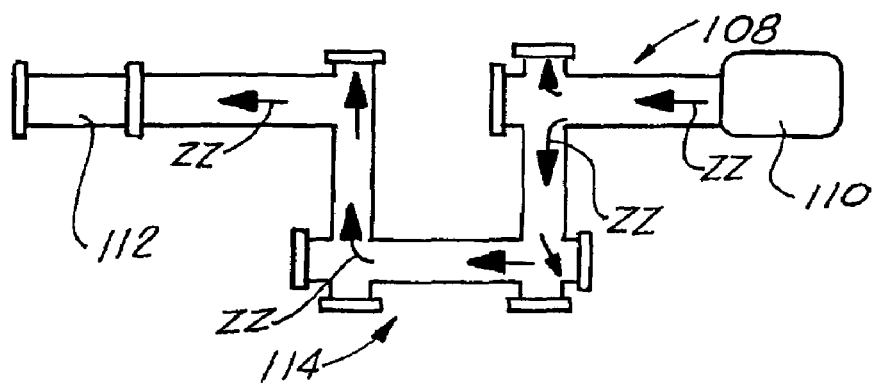
FIG. 1 is a schematic of a prior art fluid flow system.

For purposes of illustration, the following description focuses on an application wherein an acoustic filter according to the invention is incorporated in the fluid flow system including an ultrasonic device such as a multi-path ultrasonic meter, and a noise source, such as a control valve. Again, for purposes of illustration, the following description focuses on the problems and disadvantages presented by prior art systems including such an ultrasonic device and noise source, and preferred embodiments of the inventive system, apparatus and method particularly suited to address these problems and disadvantages. FIG. 1 depicts such a prior art fluid flow system 108 and is briefly described below.

FIGS. 2-7 depict ultrasonic noise filters and fluid flow systems incorporating such filters, or illustrate a method or performance associated with those noise filters, each of which embody various aspects of the invention. Upon review of the Detailed Description and the accompanying drawings provided herein, it will become apparent to one of ordinary skill in the art, however, that the present invention is also applicable to the other applications and to addressing other fluid flow and noise problems. For example, it will be apparent that the ultrasonic acoustic filter described herein may be installed in other fluid flow systems, whether gas or liquid flow, and in combination with other fluid flow elements. It will also become apparent that various elements of the ultrasonic acoustic filter provided herein (e.g., the construction of an ultrasonic noise absorbent element) may be incorporated with other acoustic noise managing devices and methods, not necessarily including all of the preferred components described herein. Moreover, it will become apparent that the invention encompasses variations of the preferred acoustic filters and preferred fluid flow systems described herein, as well as various methodologies utilizing some of these components.

The U.S. Occupational Safety and Health Act of 1970 (OSHA) established maximum permissible noise levels for all industries whose business affects interstate commerce. These permissible levels apply, of course, to industries concerned with fluid flow systems. In one method of addressing audible noise levels, certain processes and operators often convert the noise to the ultrasonic range, thereby generating yet a secondary source of ultrasonic noise.

As suggested above, control valve noise becomes a particular concern at higher pipe velocities. Control valve noise is a particular problem encountered with the installation and operation of ultrasonic meters (and other ultrasonic devices). In particular, control valve noise is a problem that has to be addressed when installing multi-path ultrasonic meters for natural gas applications. Other particularly problematic noise sources in these flow environments are flow regulators and piping induced disturbances.

Referring to the schematic of FIG. 1, in a typical ultrasonic meter application, a control valve 110 or other noise source will be placed upstream or downstream of an ultrasonic meter 112. Current practices dictate that the control valve 110 should be placed downstream of the meter 112 to ensure that the acoustic noise generated by the valve 110 does not "scramble" the acoustic signal of the ultrasonic meter. Various techniques are commonly employed to minimize the impact of the ultrasonic noise generated by the control valve 110 (none of which includes the use of an ultrasonic acoustic filter). In the particular case of multi-path ultrasonic metering station, it is a typical recommendation that either the control valve or regulator be located downstream of the meter 112. The noise generated from typical control valves normally covers a wide frequency range, part of which will include the operating range of the ultrasonic meter itself, e.g., 100-200 KHz. It is a particular challenge when the meter is operating and encounters noise levels in excess of its normal operating range. In a typical frequency response curve for a control valve, a peak frequency emitted will be approximately 60 kHz. However, it is important to illustrate that even at the higher frequencies, 100-200 KHz, it can be seen that the noise level may be in excess of 130 dB. The ultrasonic meter may operate effectively up to a noise level of 90 dB, however, above that level, the noise may be too extreme for the meter to overcome (e.g., using its traditional signal processing and gain control regimes). At this point, it becomes clear that the meter will start losing pulses during the transmission and reception cycle and become inoperable or marginally functional depending upon the noise levels being experienced.

The level of noise generated is dependent on: flow rate; pressure drop across the valve or restriction; and the type of valve or restriction. In one aspect of the invention, an ultrasonic acoustic filter is provided which accommodates the extreme noise reduction scenario of high velocity with high pressure drop, through an ultrasonically noisy restriction (such as a valve or pipe restriction).

Currently, manufacturers and operators employ different noise mitigation techniques in the meter itself ranging from increasing the amplitude of the pulse transmitted sometimes coupled with complex digital signal processing techniques. However, while the amplitude of the noise remains above that which the meter can effectively operate, it will be difficult to establish a working environment for such a meter. Thus, most manufacturers now consult with the operator to ensure that the meter has a better chance at successful operation by establishing installation criteria. For example, the manufacturer may recommend deployment of higher frequency transducers. The operation of higher frequency transducers does not guarantee, however, elimination of the noise problem entirely. From the frequency response curve, it can be seen that the noise levels at the higher frequencies, while being less than the lower frequencies, are not significantly reduced.

Secondly, the manufacturer may recommend the installation of multiple blind tees, elbows, or crosses between the source of the noise and the meter. The installation of FIG. 1, which includes blind tees (or crosses) 114, adopts this recommendation. With regard to the use of multiple "blind" or dead ended tees and elbows, this creates a number of challenges for the piping designer. For example, this adds to the complexity, extent, and efficiency of the piping system. Moreover, such a number of obstruction in the piping system presents potential erosion challenges, especially at the higher velocities. Such a complex piping configuration also provides an increased number of potential leakage sites and potential maintenance problems. In any event, the blind tee arrangement 114 of FIG. 1 may be expected to attenuate ultrasonic noise generated by the control valve by up to 8 dB.

In one aspect of the invention, a system and apparatus is provided for filtering ultrasonic noise in a fluid flow system, utilizing a minimum number of piping disturbances and a simpler configuration. In yet another aspect of the invention, a system for filtering ultrasonic noise is provided wherein the noise source, noise filtering apparatus or system, and ultrasonic device are provided along a relatively straight piping run, wherein the ultrasonic device and the noise source would otherwise be acoustically positioned along a direct line of sight (or simply, line of sight (LOS)). When there is a direct acoustic line of sight relation between the noise source and the ultrasonic device, ultrasonic noise generated by the noise source could otherwise propagate in a generally direct fashion to the ultrasonic device without reflection or obstruction.

Figure 2:
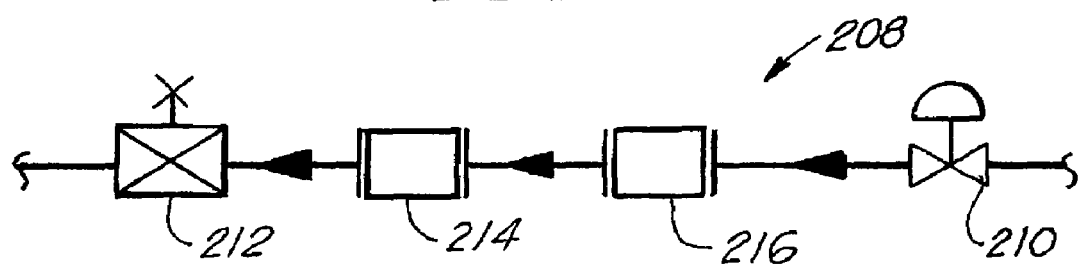
FIG. 2 is a schematic of a fluid flow system according to the present invention.

Referring to FIG. 2, a preferred fluid flow system 208 according to the invention includes an noise source such as a control valve 210, an ultrasonic device such a flowmeter 212, a first noise filtering device or noise filter 214, and, optionally, a second noise filtering device or noise filter 216. The first and second filtering devices 214,216 may be regarded also as one noise filtering apparatus or system.

As shown in the Figure, the control valve 210 and the meter 212 are disposed in fluid communication in a substantially straight piping run and are acoustically positioned such that, absent any obstructions in the flow stream, would (otherwise) be in direct line of sight relation. In such a system 208, the ultrasonic noise generated by control valve 210 has a substantial direct noise component or focus. Thus, in one aspect of the present inventive method, the ultrasonic noise propagating therefrom is first deflected by a deflector element such as second noise filter 216. In this manner, the line of sight relation between the control valve 210 and the meter 212 is eliminated. This also means that much of the direct noise generated by the control valve 210 is transformed into indirect noise by way of deflection (or by traveling through turbulent flow regions).

Although, attenuation of the ultrasonic noise does occur through use of the second noise filter 216, the preferred method employs a second phase or operation to further attenuate the ultrasonic noise. Located downstream of the second noise filter 216, the first noise filter 214 receives much of the indirect noise exiting the second noise filter 216, which at this stage may be propagating off the walls of the pipe conduit, at a rate depending partially on the pipe configuration and spacing between the filters 216, 214. In any event, according to the preferred method, the first noise filter 214 operates to absorb much of the indirect noise received therein, e.g., by converting ultrasonic noise energy to vibration within or of an absorbent material, thereby furthering attenuating the ultrasonic noise to a significant degree.

In the manner described above, attenuation of the ultrasonic noise can be attained at levels up to about 40 to 50 dB. It should be noted, however, that some of the attenuation can be attributed to other modes other than the deflecting and absorbing operations described. As will become apparent with the more detailed descriptions of the systems and apparatus provided below, the noise filters 214,216 (and other components in the fluid flow system) also have the capacity to reflect, deflect, absorb, or otherwise attenuate ultrasonic noise in other ways.

The illustrations of FIGS. 3, 3A, 3B and 3C depict an exemplary ultrasonic acoustic noise filter 310 for use with the inventive system and method. In particular, the acoustic noise filter 310 is designed to convert systematic motion of the fluid into uncoordinated random motions. Specifically, as the fluid passes through the acoustic noise filter 310, the noise filter 310 acts to isolate the piping system, by eliminating the line of sight relation between the noise source and the reference point, e.g., between the control valve and the meter. In this respect, the noise filter 310 is a suitable specific embodiment of the second noise filter 216 described above with respect to FIG. 2.

Figure 3:
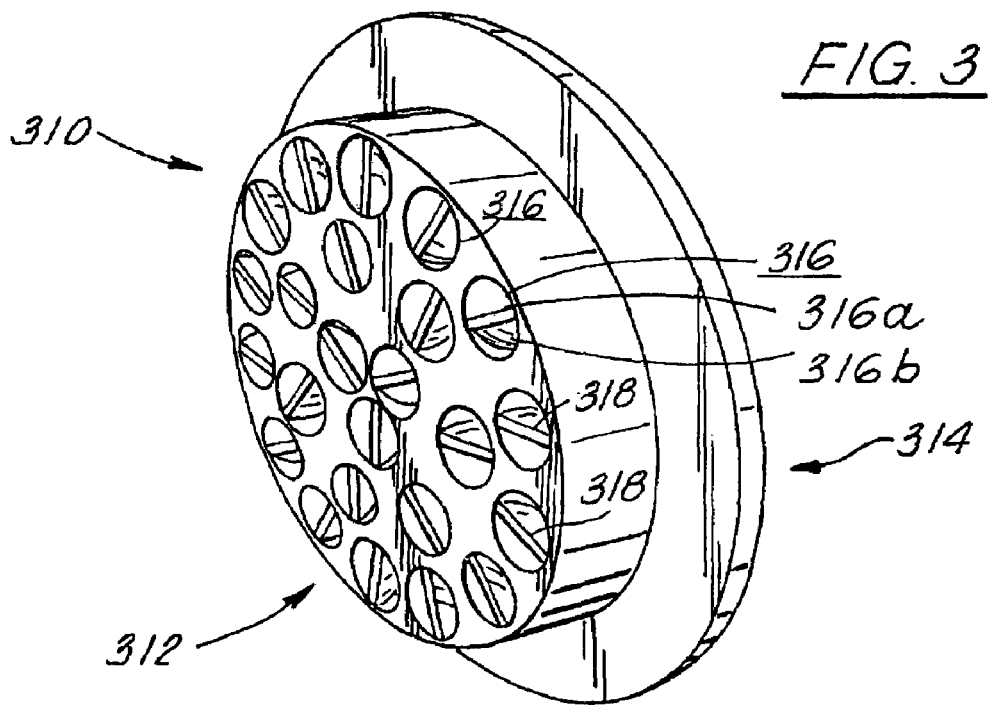
FIGS. 3, 3A, 3B, 3C and 3D are various views of an exemplary ultrasonic noise filter for deflecting and thereby attenuating ultrasonic noise, and particularly suited for use with a system, apparatus, and/or method according to the present invention.
Figures 3A, 3B:
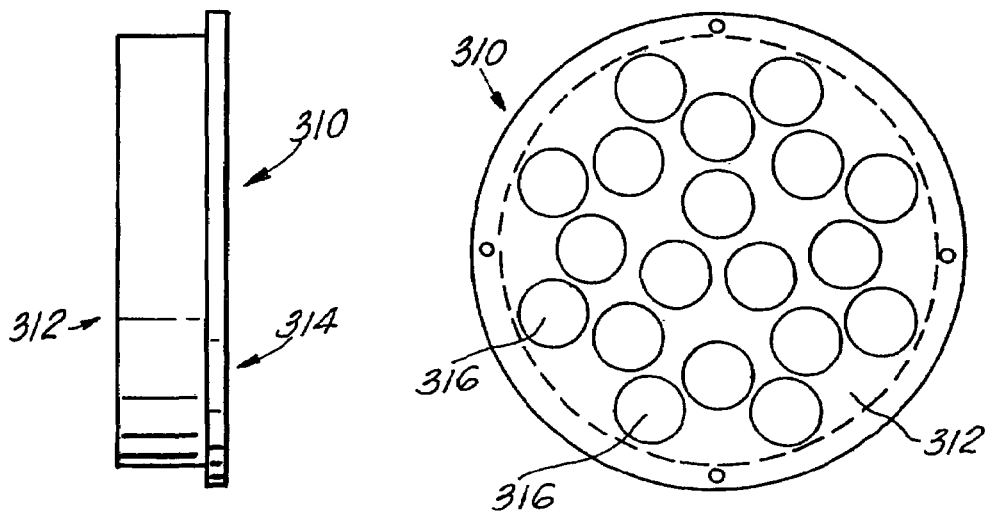

As shown in the perspective view of FIG. 3 and the side and plan views of FIGS. 3A and 3B, respectively, the acoustic noise filter 310 includes a plurality of flow through ports 316 at an upstream or entrance face 312. The ports 316 are spaced about the face 312 in a coordinated predetermined manner and so as to provide a suitable porosity value for the filter 310. In one aspect of the invention, the ports 316 is split into a first flow channel 316a and a second flow channel 316b by way of a helix 318. Each of the flow channels 316a and 316b extend through the length of the acoustic noise filter 310 to provide a flow stream thereacross. The helix 318 is inserted in the port 316, however, to split and deviate the flow in a rotative manner. More importantly, the helix 318 provides an obstruction in the longitudinal direction of the port 316, thereby eliminating the direct acoustic line of sight relation between the entrance and the exit, and more broadly, between the noise source and the reference point, e.g., the control valve and meter. In this manner, attenuation of ultrasonic noise may be effected by approximately 8 dB.

Figures 3C, 3D:
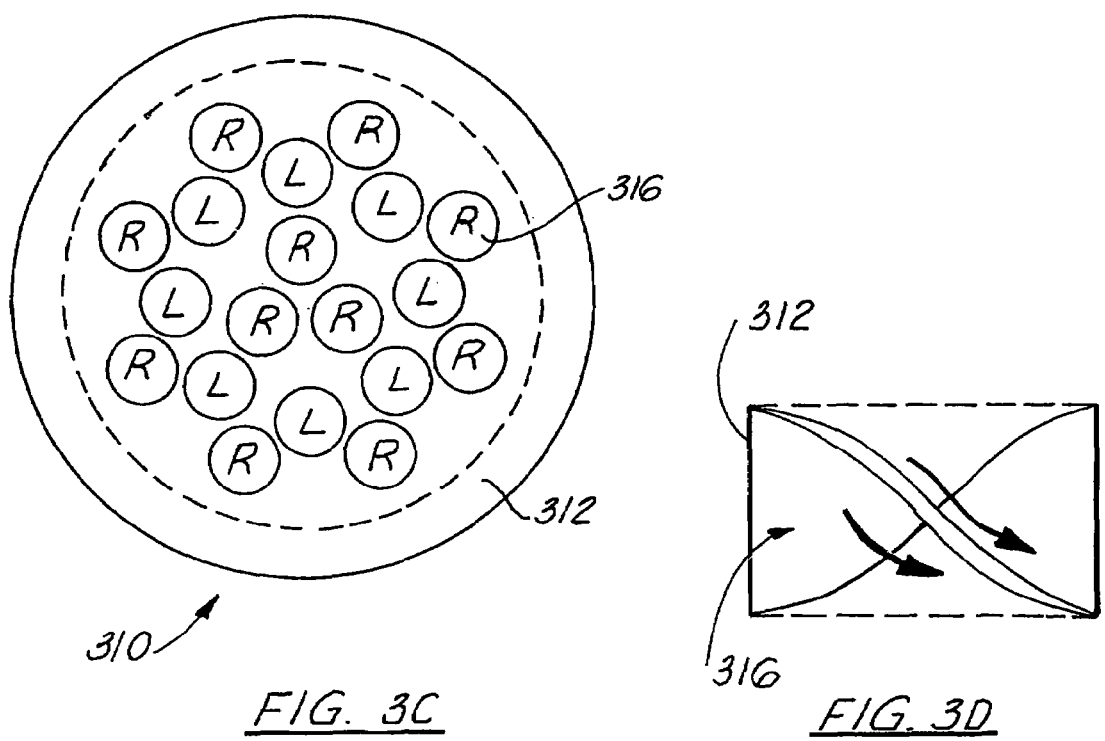

FIG. 3c is plain view illustration of the entrance face 312 of the noise filter 310. In particular, FIG. 3c charts the flow orientation of each port 316 (and the flow channels 316a, 316b provided therein). As shown in the illustration, each of the pair of flow channels 316a, 316b is either rotated (by way of the helix 318) in a clockwise or right ("R") or in the counter-clockwise or left ("L") direction. Further, each of the ports 316 is positioned such that each right rotating pairs of flow channels 316a, 316b is adjacent a left rotating pair of flow channels 316a,316b. In this way, at the downstream side of the noise filter 310c, individual flows exit in the clockwise or counter-clockwise direction. Further yet, each counter-clockwise individual flow stream is positioned adjacent an oppositely rotating or clockwise rotating flow stream. In this way, a field of turbulence is provided immediately downstream of the noise filter 310. It has been found that the provision of such a field of turbulence functions to further deflect (and attenuate) ultrasonic noise propagating through the flow stream.

Referring to FIG. 3d, the helix 318c can be made from most metallic or other rigid structure, preferably sealably welded within the port 316. In preferred embodiments, a 10" flow I.D. noise filter 316 may be configured so as to have a flow length of about 2-2½". In the case of such a 10" noise filter 310, the ports 316 preferably have a 1.5" diameter.

Figure 3E:
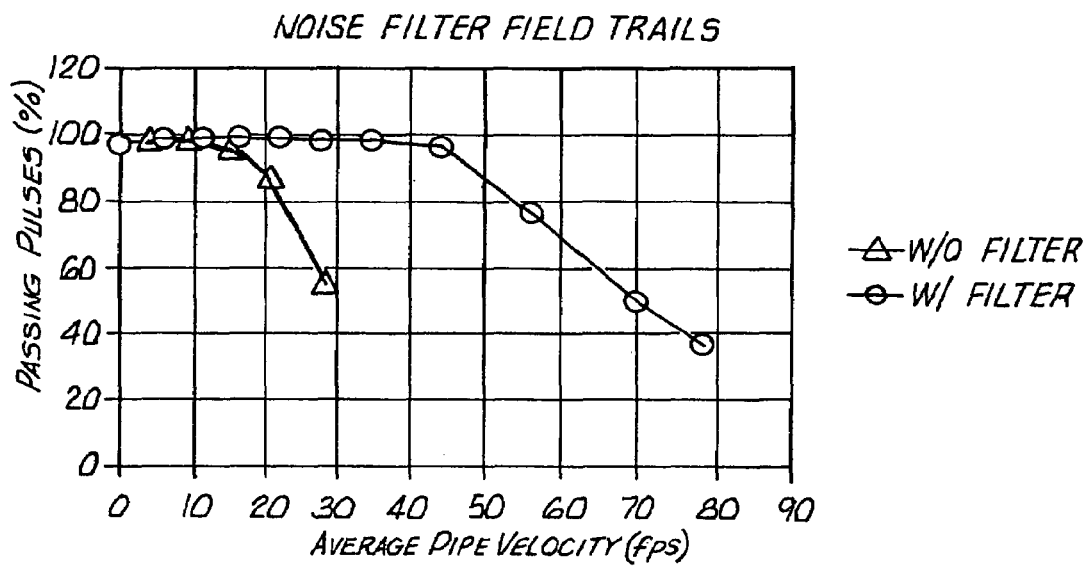
FIG. 3E is a comparison graph of noise filter field trials with and without a filter of the present invention.

FIG. 3e provides a summary of field tests or trials for an acoustic noise filter such as noise filter 310.

Figure 4:
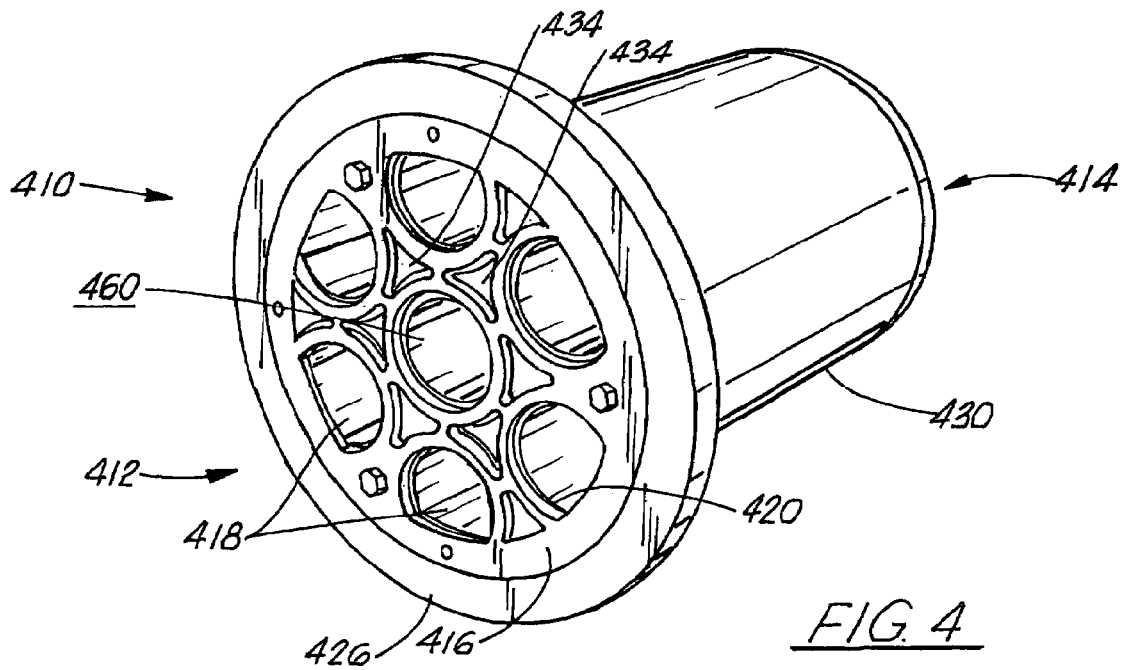
FIGS. 4, 4A, 4B, 4C, 4D, 4E, 4F, 4G and 4H are various views of another set of exemplary ultrasonic acoustic noise filters according to the invention.

FIG. 4 illustrates an exemplary ultrasonic acoustic noise filter according to the invention. More specifically, the noise filter 410 depicted in these figures are particularly suited for absorbing indirect noise propagating therethrough, in the order of about 40 to 50 dB. As further described below, the noise filter 410 provides an absorbent element having absorbent material thereon which converts indirect noise propagation into vibration (and, also thereby converting the indirect noise energy into small amounts of thermal energy). In yet another aspect of the invention, the noise filter 410 may be incorporated into a fluid flow system wherein the noise source and a reference point, e.g., a control valve and an ultrasonic flow meter, are acoustically positioned in direct line of sight relation. Further, the noise filter 410 is particularly suited for incorporation into the flow system 208 of FIG. 2 as the first noise filter 214.

Now turning to the simplified illustrations in FIG. 4, an exemplary ultrasonic acoustic noise filter 410 is shown therein, particularly suited for absorbing indirect noise so as to attenuate the ultrasonic noise by or up to 40-50 dB (gross noise absorption). FIG. 4 and FIGS. 4a-4h provide details for a noise filter 410 designed for installation in a 10" piping flow system. The noise filter 410 includes an upstream side 412, a downstream side 414, and a longitudinal structural center line XX. On the upstream side 412, the profile of the noise filter 410 is defined by a mounting ring 426 supporting a front webbing plate 416. The front webbing plate 416 provides a plurality of flow channels 418, each of which has a flow through, see through flow configuration. In this particular embodiment, the webbing plate 416 defines a group of six outside channels 418 surrounding a central or inside channel 460. Further yet, the configuration of outside channels 418 and inside channel 460 defines additional flow channels 434 positioned therebetween.

Figure 4A:
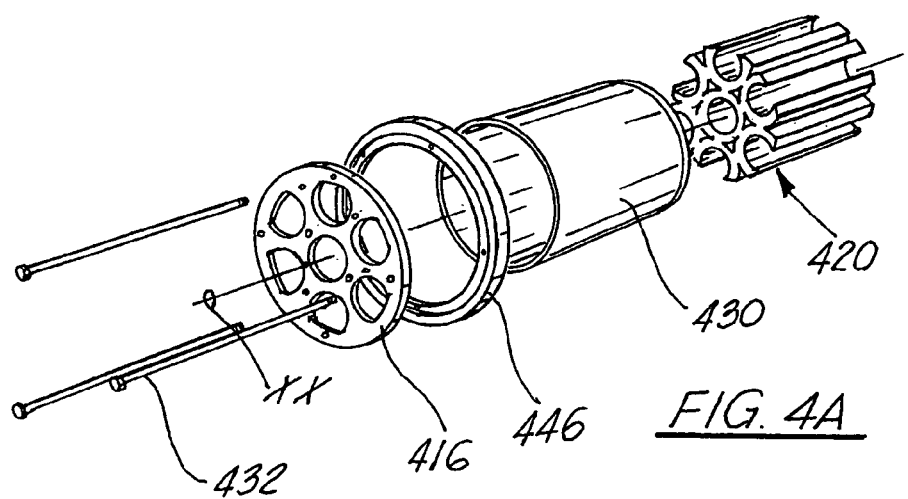
Figure 4B:
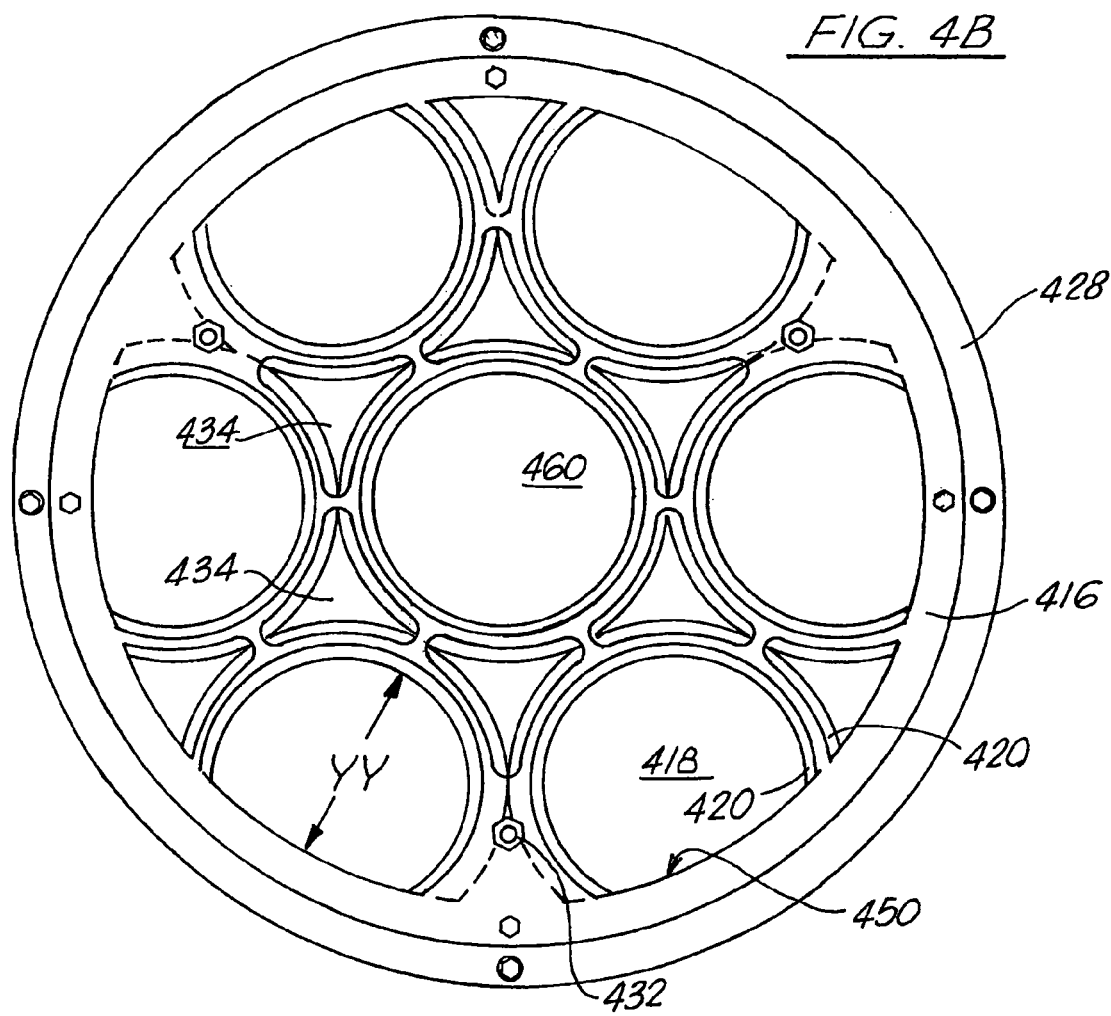
Figure 4C:
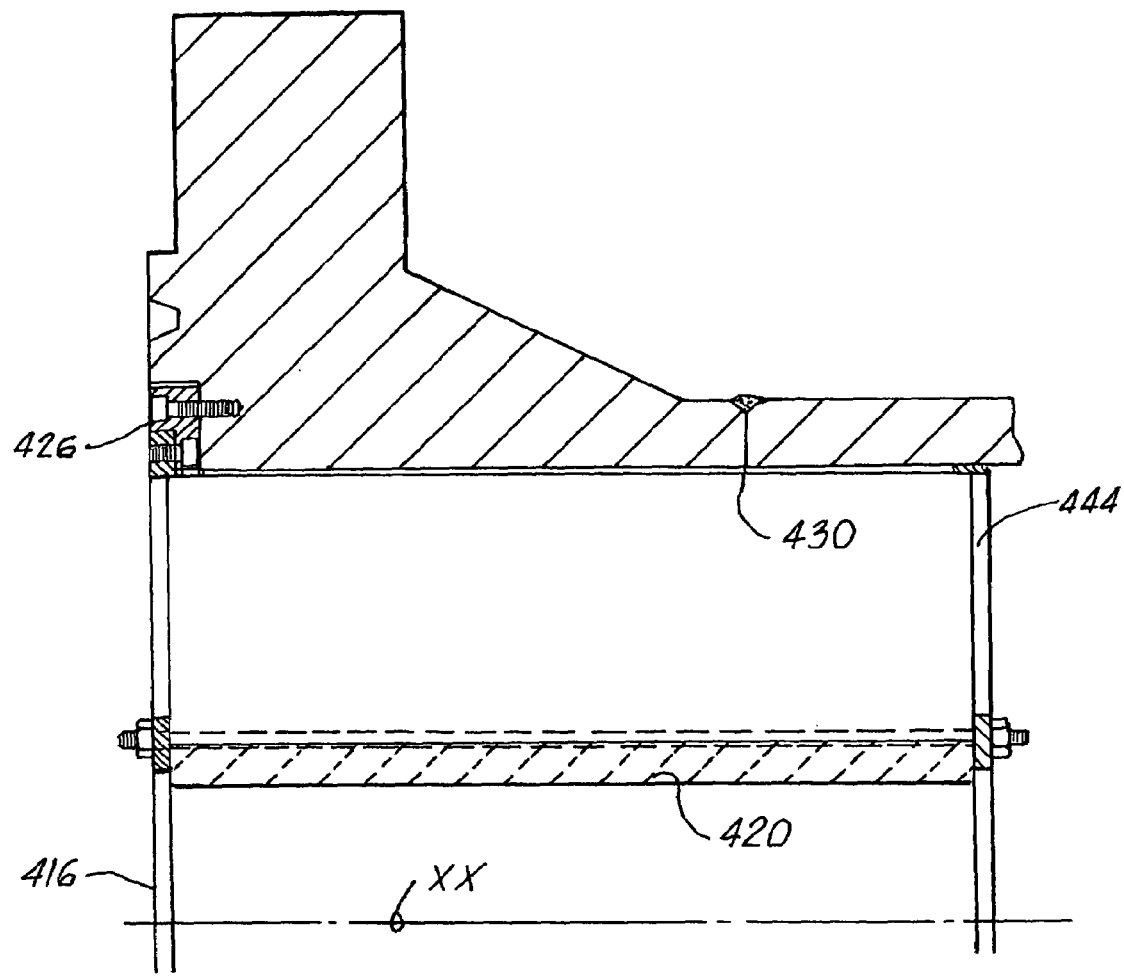
Figure 4D:
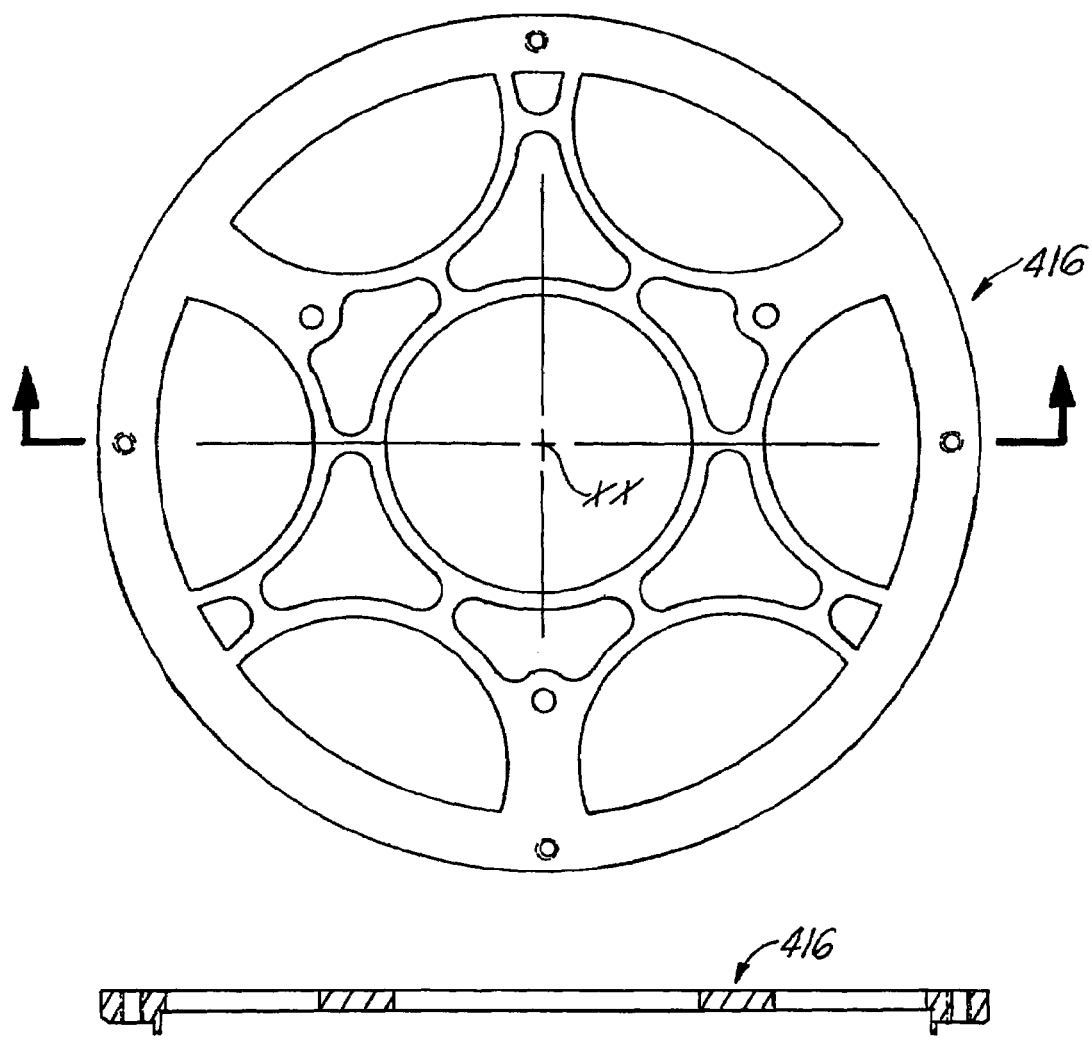
Figure 4F:
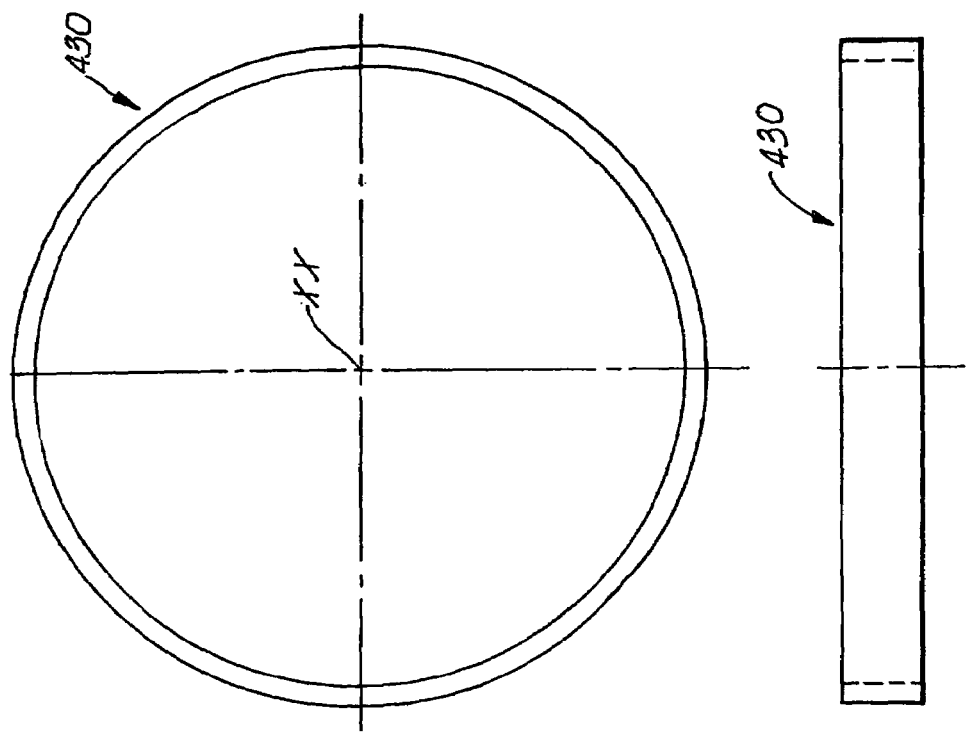
Figure 4E:
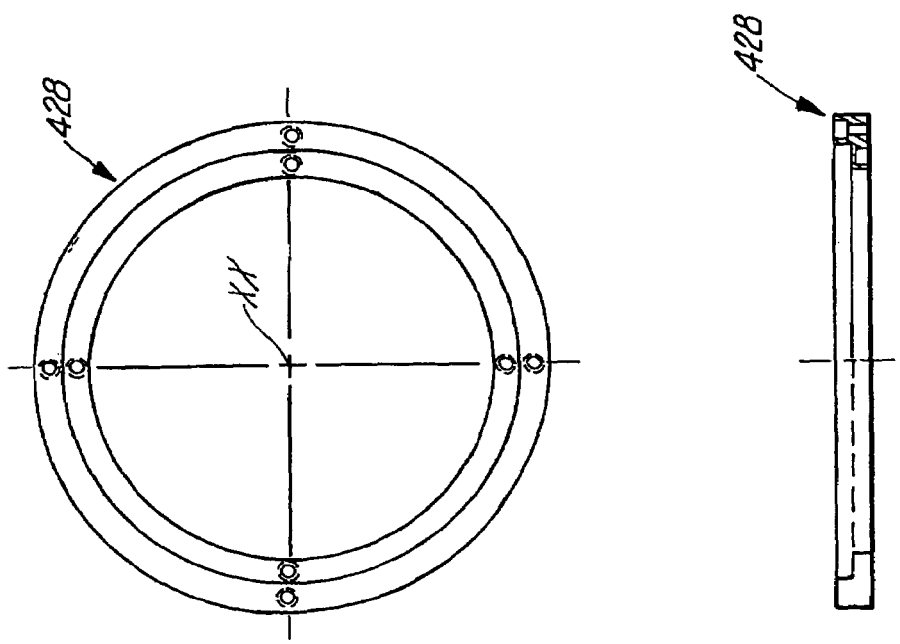
Figure 4G:
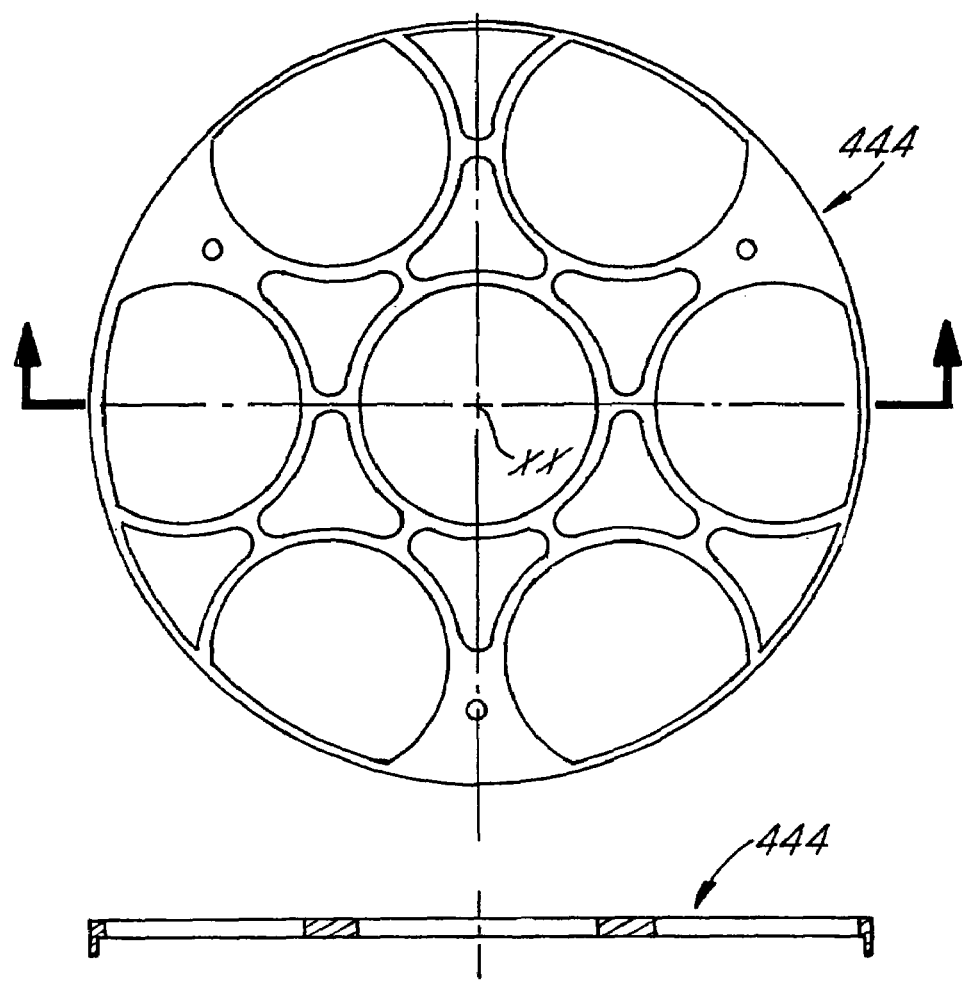
Figure 4H:
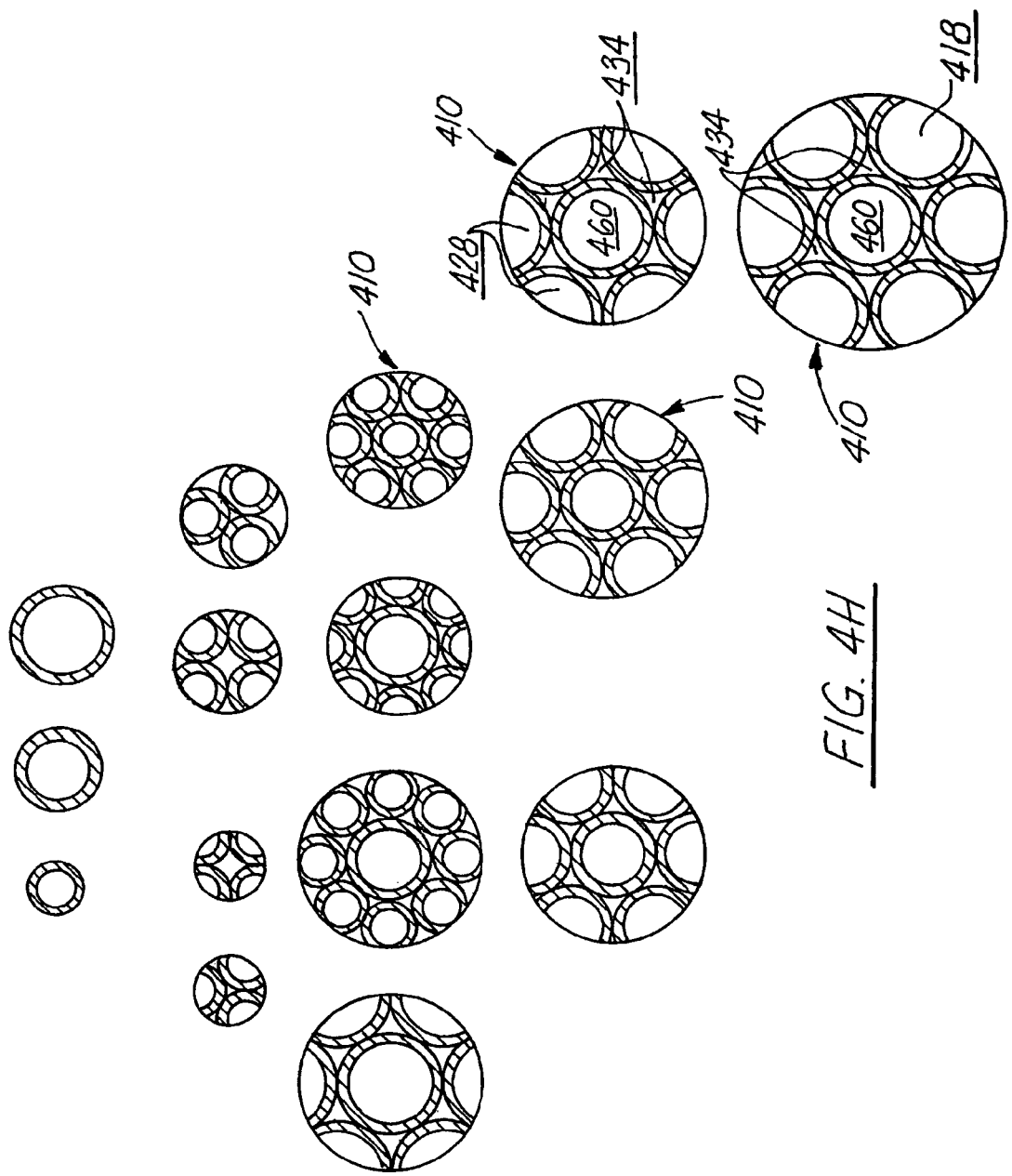

With reference also to FIGS. 4a, 4b, and 4c, the noise filter 410 also includes a canister or housing 430 that mates with the webbing plates 416, and a downstream webbing plate 444. As best illustrated in the cut out of FIG. 4c, these components house or maintain a plurality or bundle of absorbent elements 420. As will be discussed further below, the absorbent element 420 is made up of longitudinally extending absorbent material which provides an absorbent surface for indirect noise. The absorbent element 420 is further maintained in place by way of thread rods 432 that extend between the webbing plate 416 and the downstream webbing plate 444. The thread rods 432 further support the components of the noise filter 410, but specifically compressibly supports the absorbent element and material 420. It has been shown that the addition of the thread rod 432 provides advantageous structural integrity to absorbent element 420. In particular, such structural support enhances the rigidity and the ability of the absorbent element 420 to vibrate in the desired manner.

As illustrated by the Figures, each of the flow channels 418, 460, and even flow channel 434, provides a substantially straight through, see through, individual flow path. Each of channel 418 is defined by an inside surface provided by the absorbent material 420, as well as an exposed surface (i.e., free of absorbent material 420). In relation to the individual flow paths through the channels 418, 434, 460, the absorbent material is positioned in parallel relation to the substantially straight through flow path and each of the individual channels 418, 450, and 434. In other words, absorbent material will be advantageously positioned obliquely with respect to the indirect noise, but in parallel with direct noise.

Referring specifically to FIG. 4b, each of the outside channels 418 may be defined by a maximum gap YY between the exposed surface 460 and the absorbent surface defined by the absorbent material 420. In the preferred design configurations, applicants have found that optimal designs may be partially dictated by maintaining the maximum gap YY constant between noise filters in the 4" to 12" pipe diameters. As the pipe diameter varies, the number of outside channels are required to vary also (as the inside circumference of noise filter 410 also varies). This variance is further accommodated by providing and varying the size of inside channel 420. This is best illustrated in FIG. 4, wherein various webbing plate configurations are denoted by the pipe diameter. For example, for a 4" configuration, 3 or 4 outside channels are used in combination with a single inside channel. For a 16" pipe configuration, 6 outside channels are used in combination with an inside channel as well as six intermediate channels.

Referring back to FIGS. 4a and 4b, it is evident that the intermediate channels 434 are a product of the orientation of the outside channels 418 and inside channel 460. That is, the inside surface of the intermediate channels 434 are the backsides of the absorbent element 420, which define the outside channels 418 and inside channel 460. Thus, in one aspect of the invention, a unique configuration of flow through channels and absorbed materials is provided so as to optimize the surface area of the absorbent material as well as maintaining structural integrity and efficient use of materials. Moreover, in an aspect of the invention, the optimization of the design of the noise filter 410 becomes a function of or is motivated in varying degrees by the total surface area of absorbent material, the size and number of the flow channels particularly the inside and outside channels (e.g., maintaining a maximum gap YY), porosity, the length of the flow channels, and the pipe size. These parameters are, of course, related, e.g., total absorbent surface is a function the flow channels sizes and configurations, and the length of the flow channel.

Porosity is also inter-related with these parameters, e.g., increasing or decreasing the flow channel sizes affects the porosity of the noise filter 410 (because porosity is the ratio of the unrestricted to restricted area to flow). It is common to maximize the unrestricted flow for flow purposes, however, this is weighed against the structural requirements of the device. For the various embodiments of the noise filter 410 as depicted in FIG. 4, the porosity is preferably about 40-70%, the porosity and more preferably in the range of about 44-64%

As alluded to above, optimization of the noise filter 410 design is significantly governed or motivated by parameters relating to the absorbent material 420. In addition to surface area, the thickness of the absorbent material 420 and the maximum gap YY is also of importance.

In any case, FIG. 4 are provided to show preferred configurations, dimensions, material selections, and other design considerations and parameters for a noise filter 410 according to the present invention. Details of the preferred and/or optimal designs (including dimensions and surface areas) may be derived from these "to scale" construction drawings. For this purpose, a set of drawings applicable to a 12" embodiment of the noise filter 410 is also provided.

Figure 5A:
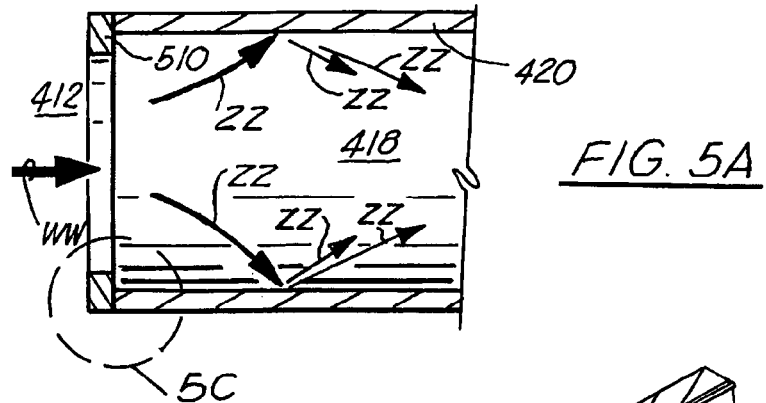
FIGS. 5A, 5B and 5C are various simplified illustrations of a preferred flow channel within a noise filter according to the invention, and including an absorbent material or absorbent element according to the invention.
Figure 5B:
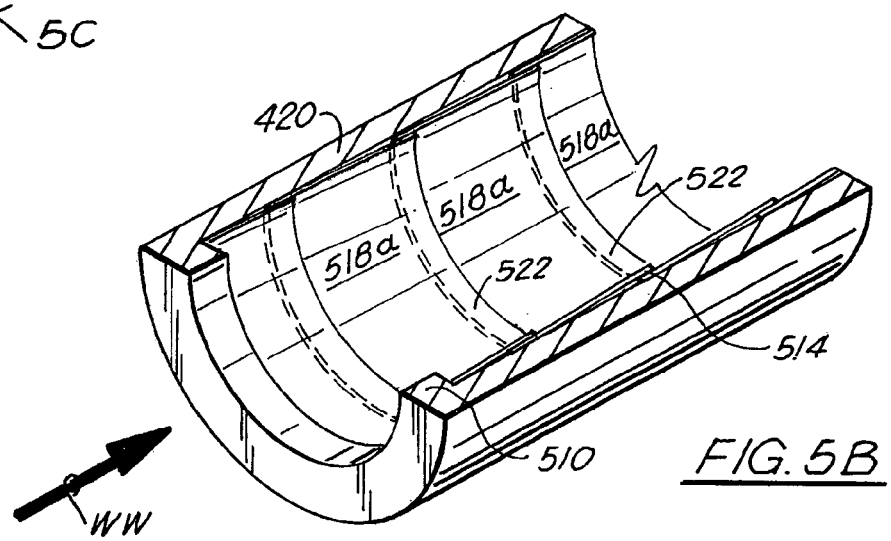
Figure 5C:
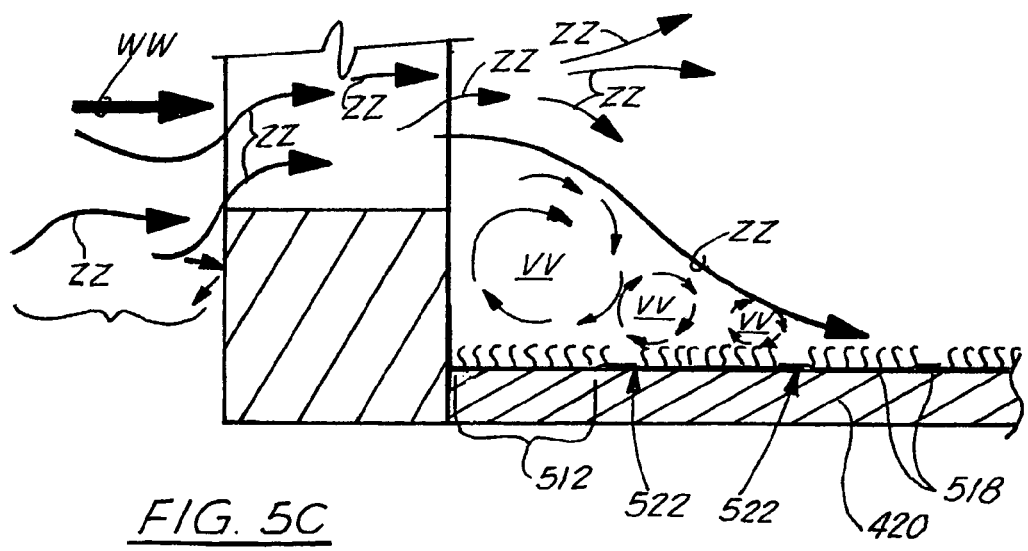

The simplified diagrams of FIGS. 5A, 5B, and 5C illustrate in some detail the construction of the noise filter 410, particularly in and around the flow pattern. More importantly, diagrams illustrate the behavior of fluid flow and acoustic wave motion within and through the flow channel. In these drawings, reference ZZ is used to denote propagation of high frequency sound wave (i.e., ultrasonic noise). It is important to note the direction (i.e., direct and indirect; reflective, direct) as well as intensity of strength of the sound wave illustrated. Reference WW is used to denote fluid flow, which, in the exemplary case, is gas flow. Finally, reference VV is used to denote a fluid area or field of turbulence.

FIG. 5A provides a longitudinal cut-out of one of the flow channels 418, specifically the portion defined by the wall surface of the absorbent material 420 (as opposed to the exposed wall surface). FIG. 5B is a yet another cut-out from the FIG. 5A, but in perspective view. FIG. 5C is a detail cross-sectional of a portion of FIG. 5A to illustrate (in both simplified and exaggerated terms), certain fluid and acoustic dynamics as would occur in the operation of a method of attenuation according to the present invention.

In yet another aspect of the invention, the absorbent element 420 (or acoustic element) of the noise filter 410 is provided with or consists of an absorbent material 420 advantageously configured and positioned within the flow stream WW to absorb, and thereby, attenuate indirect noise. The absorbent material 420 selected is both capable of absorbing indirect noise and is mechanically sound. In particular, the absorbent material is adapted to converting ultrasonic noise energy into kinetic energy in the form of elicited vibrations in the absorbent material. Further, the selected material is able to withstand both water and hydrocarbon saturation.

In preferred embodiments of the invention, a hard, man-made, fibrous material is used as the absorbent material. Moreover, the material is provided in a cylindrical configuration, formed by a very large number of the material layers 518 (see e.g., FIG. 5B). The material layers 518 are preferably spirally or helically wound to form overlapping layers (e.g., 150 layers for 3" to 5.5" OD×12" long tube)). More preferably, the absorbent material 420 includes several laterals sections 518a of polyester and propylene media formed in a conical helix pattern. Each lateral section consists of multiple helically or spirally wrapped layers 518. Thermally bonded, the layers 518 are applied to conform and overlap previously-applied layers, thereby forming the conical helix structure.

One advantageous aspect of this configuration is the formation of protrusions or steps 522 at the transition points or areas between lateral sections. As discussed below, these steps 522 function to effect additional regions or fields of turbulence VV within the flow channel 420. As best shown in FIG. 5C, the absorbent material 420 provides a rough, uneven surface due to the steps 522 as well as the fibrous materials or fibers 512, a significant portion of which protrude into the flow stream WW. Applicants have discovered that such an absorbent surface disposed in the flow path and in parallel relation therewith, enhances the absorption of ultrasonic noise.

The fibrous material or fibers 512 presents a cellular construction or network that is particularly adapted to propagating and transferring vibration energy through the absorbent material. The fibers 512 function as vibrating elements suspended from the rest of the absorbent material 420 or base. The fibers 512 also contribute to the rough texture of the absorbent surface, thereby also effecting some degree of turbulence VV.

One preferred absorbent material particularly suited for the embodiments described herein is a coreless and spirally wound filter element as described in U.S. Pat. No. 5,827,430, hereby incorporated by reference and made a part of this disclosure. The '430 patent also discusses a suitable construction of the absorbent material. It should be, noted, however, that the material taught in the '430 patent is designed and intended for a gas flow filtering operation (and not contemplated for noise management or absorption). For this and other reasons, the discovery of the advantageous application of such fibrous material in the present ultrasonic noise attenuating application was very unexpected and fortuitous.

As best shown in FIGS. 5B and 5C, the flow channel is also characterized by a lip pr dam structure 510 at the entrance face. The lip or dam 510 is created by providing an entrance radius that is less than the inside diameter or radius of the absorbent material 420. In other words, the maximum gap between the absorbent surface and an oppositely facing surface is greater than the same gap with respect to the dam 510. As shown in FIG. 5C, as fluid flow WW enters the flow channel 418, the dam 510 effects a turbulence region VV immediately downstream thereof. Additional turbulence fields VV are also effected downstream along the length of the flow channel 418, including radially inward of the steps 522 and of the fibers 518 Such turbulence contributes to the deflecting, bending, or otherwise conversion of more direct noise to randomly directed noise and thus indirect noise, which can be absorbed by the absorbent material 420. The turbulence field VV generated, therefore, enhances the capacity of the noise filter 410 to attenuate ultrasonic noise.

Thus, when indirect ultrasonic noise ZZ enters the flow channels 418 of the noise filter 418, much of the indirect noise component of the ultrasonic noise ZZ make contact with the absorbent material 420. Some of the ultrasonic noise encounter the surface areas of the webbing plate and of the dam, and are reflected therefrom. More enter the flow channel 418 and are further deviated from a direct path by turbulence fields VV. Much of the indirect noise ZZ hit the absorbent material 420, is partially absorbed, then deflect back into the flow channel 418. Such absorption and deflection pattern of the ultrasonic noise ZZ continues along the length of the flow channel 418. In any event, a significant portion of the ultrasonic noise is absorbed by the absorbent material, by converting the kinetic energy of the noise into kinetic energy or vibration of the fibrous network of the absorbent material 420.

In another aspect of the invention, the mechanical integrity of the absorbent materials or bundles of the absorbent material (see e.g. 420 in FIGS. 4b-4c) is maintained and enhanced by addition of compressible supports. In a preferred embodiment, as illustrated in FIG. 4, compressible supports are provided in the form of longitudinally extending tie rods 432. Additional support is provided by the mounting ring, webbing plates, and housing, but the total effect is a mechanically supported absorbent structure also having the desired rigidity and resiliency particularly suited to absorbing ultrasonic noise energy.

In a preferred deployment of acoustic filters according to the invention, and incorporation into a fluid flow system, the inventive acoustic noise filter as illustrated in FIG. 4, is provided in a fluid flow system including a noise source and a meter. For example, in a fluid flow system including an ultrasonic meter and a control valve, the acoustic noise filter 410 is provided in the fluid flow system and in fluid communication with the ultrasonic meter and control valve.

Figure 6E:
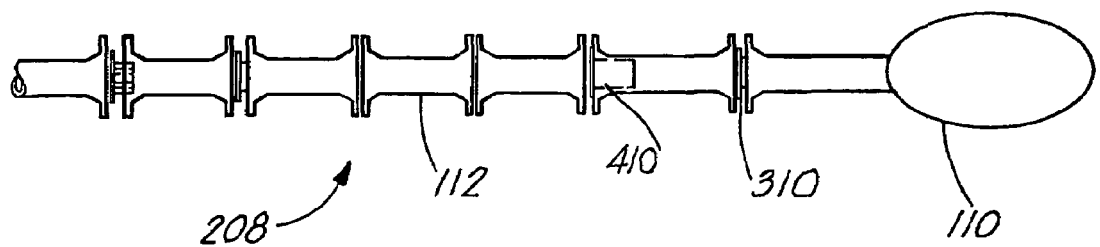
Figure 6F:
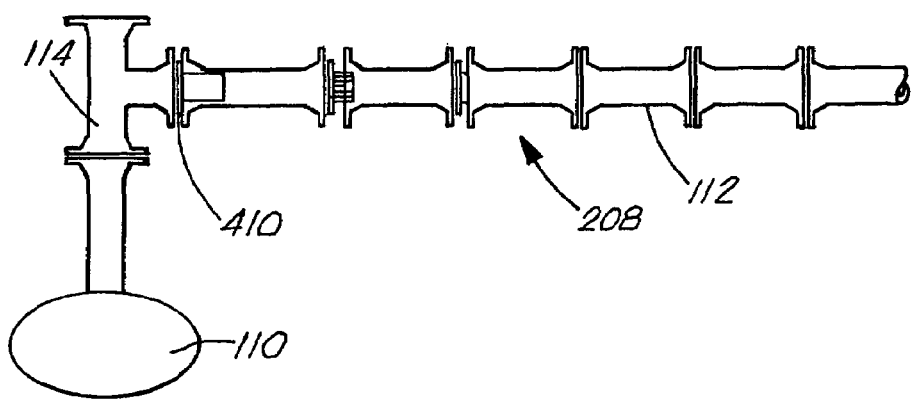
Figure 7A:
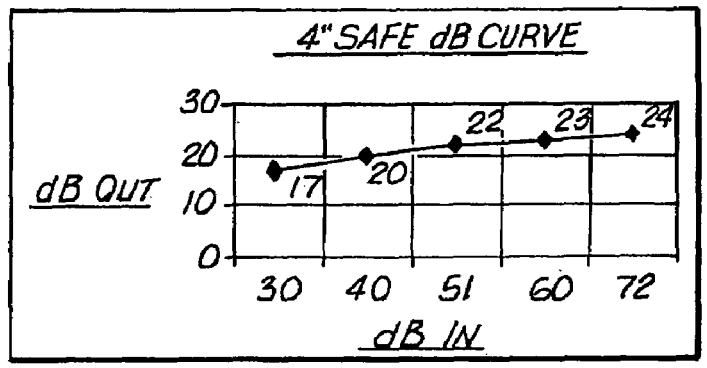
FIGS. 7A and 7B are performance results of noise filters for use with the present inventive method.
Figure 7B:
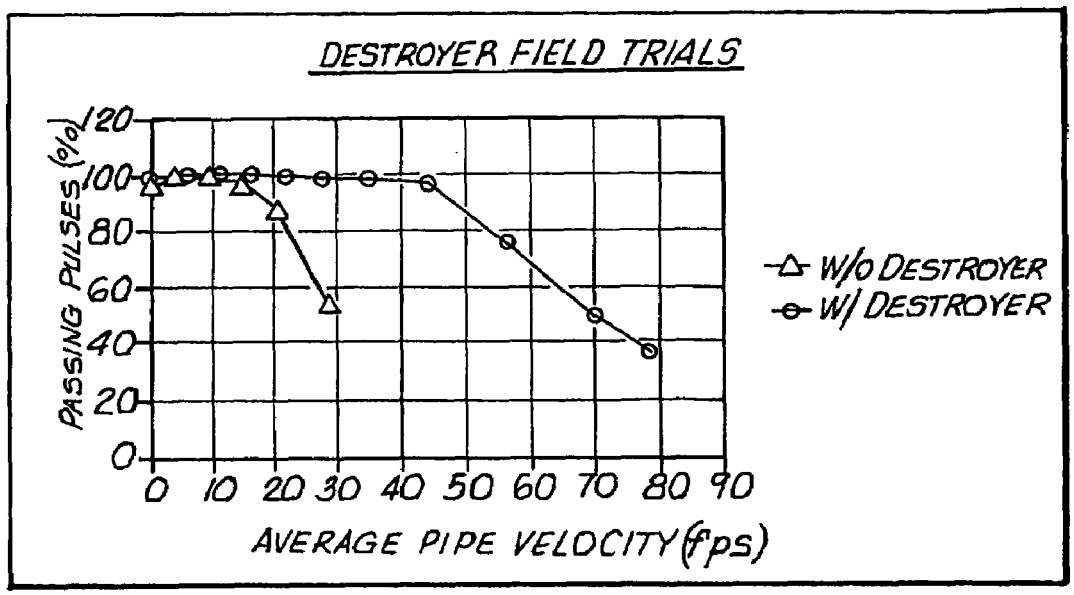

FIGS. 6a through 6f illustrate alternative deployments for an ultrasonic acoustic noise filter(s) according to the invention. In these embodiments, note that the SAFE product is provided in accordance with the invention as illustrated through FIG. 4, and the destroyer product is provided in accordance with the illustrations of FIG. 3. Referring to FIGS. 6c and 6f, in one arrangement, the SAFE noise filter (e.g., 410) is shown disposed in a flow stream defined between a meter and a noise source. As described previously, the noise filter 410 is capable of attenuating ultrasonic noise, particularly indirect noise, up to 45 dB. In these Figures, a blind tee is utilized in combination with the noise filter 410, to deflect ultrasonic noise so as to generate indirect ultrasonic noise. In particular, the blind tee eliminates the direct acoustic line of sight relation between the noise source and the meter, thereby deflecting a portion of the direct noise (while also attenuating up to 8 dB).

In yet another aspect of the invention, a fluid flow system arrangement, as shown in FIG. 6e, is provided in which the meter and the noise source are in serial relation within a fluid flow stream. In particular, the meter and noise source are disposed in fluid communication with each other and in a substantially straight piping run between them. In other words, the meter and the noise source, absent some obstruction in the fluid flow stream, are positioned so as to be in direct acoustic line of sight relation. In accordance with the invention, such an arrangement between the meter and a noise source is made possible through use of an ultrasonic noise filter 410. As discussed previously, incorporation of the noise filter 410 in the fluid flow system of FIG. 6e (without noise filter 310) effectively attenuates the noise up to about 20 to 30 dB of substantially direct noise without a significant direct noise component). Again, as discussed previously, the deployment of the noise filter 410 effectively attenuates much of the significant portion of the indirect noise generated by the noise source, and also through reflection (e.g., by presenting non-porous or flow restrictive surfaces provided primarily on the upstream webbing plate).

Preferably, a fluid flow system arrangement as shown in FIG. 6e will also include a second noise filter 310. Particularly, the second noise filter 310 is used to eliminate the line of sight relation between the meter and the noise source. In this manner, as discussed previously, the noise filter 310 effectively deflects direct ultrasonic noise, thereby attenuating ultrasonic noise by as much as 8 dB. More importantly, the noise filter 310 deflects direct ultrasonic noise so as to convert the direct noise to indirect noise, as it exits downstream of the noise filter 310. This indirect noise can then be absorbed by the absorbent materials of the noise filter 410. In this manner, the combination of the noise filter 310 (primarily a deflector element) and the noise filter 410 (primarily an absorbent element) attenuates the ultrasonic noise up to about 40 dB to 50 dB.

It should be understood, however, that various arrangements and deployments of acoustic noise filtering devices in accordance with the invention may be made and will vary according to the particular environment and applications. However, in any such applications, various aspects of the inventions will be applicable, as described above.

The foregoing description of the present invention has been presented for purposes of illustration description. It is to be noted that the description is not intended to limit invention to the system, apparatus, and method disclosed herein. Various aspects of the invention as described above may be applicable to other types of fluid flow systems and methods for filtering noise, or for attenuating ultrasonic noise. It is be noted also that the invention is embodied in the method described, the system and apparatus utilized in the methods, and in the related components and subsystems. For example, elements of the ultrasonic acoustic noise filter described above, for example the use and configuration of the absorbent material, or the use or configuration of the flow channels to eliminate the line of sight, may be implemented in other fluid flow applications or devices. These variations of the invention will become apparent to one skilled in the acoustics, fluid mechanics, or other relevant art, provided with the present disclosure. Consequently, variations and modifications commensurate with the above teachings and the skill and knowledge of the relevant art are within the scope of the present invention. The embodiments described and illustrated herein are further intended to explain the best modes for practicing the invention, and to enable others skilled in the art to utilize the invention and other embodiments and with various modifications required by the particular applications or uses of the present invention.

What is claimed is:

1. An ultrasonic noise filter for use with a fluid flow conduit, said noise filter comprising:
    a flow entrance;
    a flow exit;
    said flow entrance and said flow exit defining a flow path extending therebetween, said flow path having a longitudinal centerline; and
    an absorbent element disposed in said flow path, said absorbent element including lateral sections of absorbent material configured to absorb indirect noise propagating in said flow path, said lateral sections formed by spirally wound layers of said absorbent material.

2. The noise filter of claim 1, wherein said lateral sections overlap to form protrusions into the flow path, said protrusions being adapted to effect turbulent fluid flow in the flow path.

3. The noise filter of claim 1, further comprising a plurality of channels defining said flow path, each said channel including said lateral sections of said absorbent material.

4. The noise filter of claim 3, wherein said plurality of channels includes a plurality of outside channels positioned radially equidistant from a longitudinal centerline of said noise filter, and an inside channel positioned about said common longitudinal centerline.

5. The noise filter of claim 3, wherein said absorbent element includes each of said lateral sections of absorbent material disposed in said channels, said absorbent element being configured to attenuate ultrasonic noise by at least about 20 dB.

6. The noise filter of claim 1, wherein said absorbent material includes protrusions adapted to effect turbulence in said flow path.

7. The noise filter of claim 1, wherein said absorbent material is configured to absorb indirect ultrasonic noise in said flow path by converting the indirect ultrasonic noise to vibration.

8. The noise filter of claim 1, wherein said absorbent material is a fibrous absorbent material.

9. The noise filter of claim 1, wherein said absorbent material is polyester.

10. An ultrasonic noise filter for use with a fluid flow conduit, said noise filter comprising:
    a flow entrance;
    a flow exit;
    said flow entrance and said flow exit defining a flow path extending therebetween, said flow path having a longitudinal centerline; and
    an absorbent spirally wound polyester element disposed in a portion of said flow path, said absorbent spirally wound polyester element configured to absorb indirect noise propagating in said flow path.

11. The noise filter of claim 10, further comprising lateral sections of absorbent material, wherein said lateral sections overlap to form protrusions into the flow path, said protrusions being adapted to effect turbulent fluid flow in the flow path.

12. The noise filter of claim 10, further comprising a plurality of channels defining said flow path.

13. The noise filter of claim 12, wherein said plurality of channels includes a plurality of outside channels positioned radially from a longitudinal centerline of said noise filter, and an inside channel positioned about said common longitudinal centerline.

14. The noise filter of claim 12, wherein said absorbent element is disposed in said channels, said absorbent element being configured to attenuate ultrasonic noise by at least about 20 dB.

15. The noise filter of claim 10, wherein said absorbent element includes protrusions adapted to effect turbulence in said flow path.

16. The noise filter of claim 10, wherein said absorbent element is configured to absorb indirect ultrasonic noise in said flow path by converting the indirect ultrasonic noise to vibration.

17. The noise filter of claim 10, wherein said absorbent element is a fibrous absorbent material.

18. An ultrasonic noise filter for use with a fluid flow conduit, said noise filter comprising:
    a flow entrance;
    a flow exit;

said flow entrance and said flow exit defining a flow path extending therebetween, said flow path having a longitudinal centerline; and an absorbent spirally wound element disposed in a portion of said flow path, said absorbent element configured to absorb indirect noise propagating in said flow path.

19. The noise filter of claim 18, wherein said absorbent element is a fibrous absorbent material.

20. The noise filter of claim 18, wherein said absorbent element is polyester.

* * * * *